US011699155B2

United States Patent
Dutt et al.

(10) Patent No.: US 11,699,155 B2
(45) Date of Patent: Jul. 11, 2023

(54) CONTEXT-DEPENDENT AUTHENTICATION SYSTEM, METHOD AND DEVICE

(71) Applicant: Zighra Inc., Ottawa (CA)

(72) Inventors: Deepak Chandra Dutt, Ottawa (CA); Anil Buntwal Somayaji, Ottawa (CA)

(73) Assignee: Zighra Inc., Ottawa (CA)

( * ) Notice: Subject to any disclaimer, the term of this patent is extended or adjusted under 35 U.S.C. 154(b) by 82 days.

(21) Appl. No.: 16/915,165

(22) Filed: Jun. 29, 2020

(65) Prior Publication Data

US 2020/0327458 A1   Oct. 15, 2020

Related U.S. Application Data

(63) Continuation of application No. 15/447,253, filed on Mar. 2, 2017, now Pat. No. 10,740,758, which is a (Continued)

(51) Int. Cl.
*G06Q 20/40* (2012.01)
*G06F 21/30* (2013.01)
(Continued)

(52) U.S. Cl.
CPC ......... *G06Q 20/4016* (2013.01); *G06Q 10/00* (2013.01); *G06Q 20/202* (2013.01); *G06Q 20/322* (2013.01); *G06Q 20/327* (2013.01); *G06Q 20/40145* (2013.01); *G06Q 50/265* (2013.01); *H04L 63/08* (2013.01); *H04L 63/1408* (2013.01); *H04W 12/06* (2013.01); *H04W 12/065* (2021.01);
(Continued)

(58) Field of Classification Search
None
See application file for complete search history.

(56) References Cited

U.S. PATENT DOCUMENTS 5,544,321 A   8/1996  Theimer
6,334,121 B1  12/2001 Primeaux
(Continued)

FOREIGN PATENT DOCUMENTS

GB        2419067        4/2006
WO    WO 2008/0041915   4/2008
(Continued)

OTHER PUBLICATIONS

Rodgers, J.L. Thirteen Ways to Look at the Correlation Coefficient Data. The American Statistician, 41(1) 59, doi: 10.2307/2685263 (1998).
(Continued)

*Primary Examiner* — Paul Danneman
(74) *Attorney, Agent, or Firm* — Mahamedi IP Law LLP

(57) ABSTRACT

A method for authenticating a user using a user device connected to a communications network, the method comprising an implicit phase, wherein said implicit phase comprises performing at least one task within a workflow, said at least one task necessary to move forward within said workflow; storing information associated with said performing of at least one task; comparing said stored information with a stored user profile; and determining whether said authentication of said user is successful or unsuccessful based on said comparing.

19 Claims, 17 Drawing Sheets

Related U.S. Application Data continuation of application No. 14/337,939, filed on Jul. 22, 2014, now Pat. No. 9,619,852, which is a continuation-in-part of application No. PCT/CA2013/050295, filed on Apr. 17, 2013.

(60) Provisional application No. 61/625,112, filed on Apr. 17, 2012.

(51) Int. Cl.

| | |
|---|---|
| H04W 12/12 | (2021.01) |
| G06Q 10/00 | (2023.01) |
| G06Q 20/20 | (2012.01) |
| G06Q 20/32 | (2012.01) |
| G06Q 50/22 | (2018.01) |
| H04W 12/06 | (2021.01) |
| H04W 12/68 | (2021.01) |
| H04L 9/40 | (2022.01) |
| G06Q 50/26 | (2012.01) |
| H04W 12/065 | (2021.01) |
| H04W 12/126 | (2021.01) |
| G06F 21/31 | (2013.01) |

(52) U.S. Cl.
CPC ........... *H04W 12/126* (2021.01); *G06F 21/31* (2013.01); *G06F 2221/2105* (2013.01); *H04L 63/0861* (2013.01); *H04W 12/68* (2021.01)

(56) References Cited

U.S. PATENT DOCUMENTS

| | | | |
|---|---|---|---|
| 6,542,729 B1 | 4/2003 | Chmaytelli | |
| 6,810,480 B1 | 10/2004 | Parker | |
| 7,081,905 B1* | 7/2006 | Raghunath | G04G 5/00 |
| | | | 368/186 |
| 7,155,417 B1 | 12/2006 | Sagar | |
| 7,162,741 B2 | 1/2007 | Eskin | |
| 7,391,326 B2 | 6/2008 | Puzio | |
| 7,689,524 B2 | 3/2010 | Ozzie | |
| 7,739,951 B2 | 6/2010 | Stab | |
| 7,979,899 B2 | 7/2011 | Guo | |
| 8,020,005 B2 | 9/2011 | Mani | |
| 8,065,277 B1 | 11/2011 | Gardner | |
| 8,145,561 B1 | 3/2012 | Zhu | |
| 8,321,360 B2 | 11/2012 | Lanxner | |
| 8,355,987 B2 | 1/2013 | Hirson | |
| 8,359,278 B2 | 1/2013 | Domenikos | |
| 8,577,803 B2 | 11/2013 | Chatterjee | |
| 8,816,818 B2 | 8/2014 | Yamada | |
| 8,863,307 B2 | 10/2014 | Sorek | |
| 9,117,068 B1 | 8/2015 | Zhang | |
| 9,264,419 B1 | 2/2016 | Johansson | |
| 9,367,676 B2 | 6/2016 | Wilson | |
| 9,386,507 B1 | 7/2016 | Ramalingham | |
| 9,396,316 B1 | 7/2016 | Altman | |
| 9,471,920 B2 | 10/2016 | Kolkowitz | |
| 9,727,713 B2 | 8/2017 | Agawa | |
| 9,788,203 B2 | 10/2017 | Dutt | |
| 9,871,813 B2 | 1/2018 | Andreeva | |
| 10,187,799 B2 | 1/2019 | Dutt | |
| 10,262,324 B2 | 4/2019 | Turgeman | |
| 10,298,614 B2 | 5/2019 | Turgeman | |
| 10,306,052 B1 | 5/2019 | Lack | |
| 10,404,729 B2 | 9/2019 | Turgeman | |
| 10,588,017 B2 | 3/2020 | Dutt | |
| 10,621,585 B2 | 4/2020 | Turgeman | |
| 10,685,355 B2 | 6/2020 | Novick | |
| 10,747,305 B2 | 8/2020 | Turgeman | |
| 10,834,590 B2 | 11/2020 | Turgeman | |
| 10,949,514 B2 | 3/2021 | Turgeman | |
| 10,949,757 B2 | 3/2021 | Turgeman | |
| 11,223,619 B2 | 1/2022 | Turgeman | |
| 11,269,977 B2 | 3/2022 | Turgeman | |
| 2002/0184080 A1 | 12/2002 | Murad | |
| 2003/0110393 A1 | 6/2003 | Brock | |
| 2005/0166065 A1 | 7/2005 | Evtchison | |
| 2006/0223495 A1 | 10/2006 | Cassett | |
| 2006/0224898 A1 | 10/2006 | Ahmed | |
| 2006/0282660 A1 | 12/2006 | Varghese | |
| 2007/0061590 A1 | 3/2007 | Boye | |
| 2007/0219801 A1 | 9/2007 | Sundaram | |
| 2008/0020733 A1 | 1/2008 | Wassingbo | |
| 2008/0036591 A1 | 2/2008 | Ray | |
| 2008/0092245 A1 | 4/2008 | Alward | |
| 2008/0014771 A1 | 5/2008 | Welingkar | |
| 2008/0113650 A1 | 5/2008 | Engstrom | |
| 2008/0220854 A1 | 9/2008 | Midgley | |
| 2009/0254572 A1 | 10/2009 | Redlich et al. | |
| 2009/0313693 A1 | 12/2009 | Rogers | |
| 2009/0327132 A1 | 12/2009 | Diev | |
| 2010/0004997 A1 | 1/2010 | Mehta | |
| 2010/0010907 A1 | 1/2010 | Dasgupta | |
| 2010/0057623 A1 | 3/2010 | Kapur | |
| 2010/0100439 A1 | 4/2010 | Jutla | |
| 2010/0107238 A1 | 4/2010 | Stedman | |
| 2010/0115610 A1 | 5/2010 | Tredoux | |
| 2010/0192209 A1 | 7/2010 | Steeves | |
| 2010/0248706 A1 | 9/2010 | Potkonjak | |
| 2011/0016534 A1 | 1/2011 | Jakobsson | |
| 2011/0148633 A1 | 6/2011 | Kohlenberg et al. | |
| 2011/0202461 A1 | 8/2011 | Lundgren | |
| 2011/0209159 A1 | 8/2011 | Baratz et al. | |
| 2011/0225644 A1 | 9/2011 | Pullikottil | |
| 2012/0149449 A1 | 6/2012 | Choi | |
| 2012/0203663 A1 | 8/2012 | Sinclair | |
| 2012/0233658 A1 | 9/2012 | Piersol | |
| 2012/0235938 A1 | 9/2012 | Laughbach | |
| 2012/0239479 A1 | 9/2012 | Amaro | |
| 2012/0253957 A1 | 10/2012 | Bakshi | |
| 2012/0278094 A1 | 11/2012 | Kovacevic | |
| 2012/0300938 A1 | 11/2012 | Kean | |
| 2012/0323717 A1 | 12/2012 | Kirsch | |
| 2013/0030875 A1 | 1/2013 | Lee | |
| 2013/0042327 A1 | 2/2013 | Chow | |
| 2013/0061285 A1 | 3/2013 | Donfried et al. | |
| 2013/0097683 A1 | 4/2013 | Davis | |
| 2013/0102283 A1 | 4/2013 | Lau | |
| 2013/0104187 A1 | 4/2013 | Weidner | |
| 2013/0110658 A1 | 5/2013 | Lyman | |
| 2013/0133033 A1 | 5/2013 | Davis | |
| 2013/0160087 A1 | 6/2013 | Davis | |
| 2013/0181949 A1 | 7/2013 | Setlak | |
| 2013/0191908 A1 | 7/2013 | Klein | |
| 2013/0205387 A1 | 8/2013 | Le et al. | |
| 2013/0232159 A1 | 9/2013 | Daya | |
| 2013/0239206 A1* | 9/2013 | Draluk | G06F 21/31 |
| | | | 726/19 |
| 2013/0275355 A1 | 10/2013 | Miltonberger | |
| 2013/0276118 A1 | 10/2013 | Kashyap | |
| 2013/0344859 A1 | 12/2013 | Abramson | |
| 2013/0347066 A1 | 12/2013 | Wells | |
| 2014/0068778 A1 | 3/2014 | Bhatia | |
| 2014/0092052 A1 | 4/2014 | Grunthaner | |
| 2014/0201120 A1 | 7/2014 | Lydon | |
| 2014/0289867 A1 | 9/2014 | Bukai | |
| 2014/0037243 A1 | 11/2014 | Dutt | |
| 2014/0337945 A1 | 11/2014 | Jai et al. | |
| 2016/0259924 A1 | 9/2016 | Dutt | |
| 2017/0163471 A1 | 6/2017 | Zheng | |

FOREIGN PATENT DOCUMENTS

| | | |
|---|---|---|
| WO | WO 2011/006381 | 6/2011 |
| WO | WO 2013/155628 | 10/2013 |

OTHER PUBLICATIONS

ISR and Written Opinion in PCT/IB2014/063959 dated Dec. 8, 2014.

(56) References Cited

OTHER PUBLICATIONS

Wang, Analysis of human electrocardiogram for biometric recognition, EURASIP Journal on Advances in Signal Processing, 2008:19, 2008.

Behavio Gesture Lock https://play.google.com/store/apps/details/ Aug. 19, 2013.

Li, Yiru "Securing email archives through user modeling", Computer Security Applications Conference, 21st Annual, IEEE, 2005.

Li, Yiru, "Toward Email Archive Intrusion Detection", Master of Computer Science dissertation, Carleton University, 2005.

Thorpe, Pass-thoughts: authenticating with our minds, Proceedings of the 2005 workshop of new security paradigms (NSPW '05), ACM, New York 2005.

Zakaria, Shoulder surfing defence for recall-based graphical passwords, Proceedings of the Seventh Symposium on Unsable Privacy and Security, p. 6, ACM, 2011.

Furnell, Beyond the PIN: Enhancing user authentication for mobile devices, Computer Fraud & Security, Aug. 2008, pp. 12-17, vol. 2008, Issue 8, Elsevier, Plymouth, UK.

Furnell, Authentication of users on mobile telephones—A survey of attitudes and practices, Computers & Security, Oct. 2005, pp. 519-527, vol. 24, Issue 7, Elsevier, Perth, Australia.

Feng, Continuous mobile authentication using touchscreen gestures, Homeland Security (HST), 2012 IEEE, Conference on Technologies, Nov. 2012, pp. 451-456, IEEE.

Frank, Touchalytics: On the Applicability of Touchscreen Input as a Behavioral Biometric for Continuous Authentication, Jan. 2013, pp. 136.

Lin, A New Non-lntrusive Authentication Method based on the orientation sensor for Smartphone users, IEEE Sixth International Conference oon Software Security and Reliability (SERE), Aug. 2012, pp. 245-252, IEEE.

Derawi, Unobtrusive User Authentication on Mobile Phones Using Biometric Gait Recognition, Intelligent Information Hiding and Multimedia Signal Processing (IIH-MSP), 2010 Sixth International Conference, Oct. 2010, IEEE.

Palaniappan, Biometrics from Brain Electrical Activity: A machine learning Approach, IEEE Transaction on Pattern Analysis and Machine Intelligence, Apr. 2007, pp. 738-742, vol. 29, No. 4, IEEE Computer Society.

Monrose, Keystroke dynamics as a biometric for authentication, Future Generation Computer Systems, Feb. 2000, pp. 351-359, vol. 16, Issue 4, Elsevier, New York, NY, USA.

Zhao, Face recognition: A literature survey, Computing Surveys (CSUR), Dec. 2003, pp. 399-458, vol. 35 Issue 4, ACM, New York, NY, USA.

Plamondon, Online and off-line handwriting recognition: a comprehensive survey, Pattern Analysis and Machine Intelligence, Jan. 2000, pp. 63-84, vol. 22, Issue: 1, IEEE.

Jakobsson, Implicit Authentication for Mobile Devices, Proceedings of the 4th USENIX conference on Hot topics in security, 2009, pp. 9-9, USENIX Association.

Shi, Implicit Authentication through Learning User 15 Behavior, Information Security, 2011, pp. 99-113, vol. 6531, Springer.

Riva, Progressive Authentication Deciding When to Authenticate on Mobile Phones, 21st USENIX Security Symposium, 2012, USENIX.

Shi, W., Sengard: Passive user identification on smartphones using multiple sensors, 2011 IEEE 7th International Conference on Wireless and Mobile Computing, Networking and Communications (WiMob), 2011, pp. 141-148, IEEE.

Bo, SilentSense: silent user identification via touch and movement behavioral biometrics, 19th annual international conference on Mobile computing & networking, 2013, pp. 187-190, ACM, New York, NY, USA.

Clarke, Authenticating mobile phone users using keystroke analysis, International Journal of Information Security, Jan. 2007, pp. 1-14, vol. 6, Issue 1, Springer.

Li, Securing email archives through user modeling, Computer Security Applications Conference, 21 Annual, 2005, IEEE.

Li, Toward Email Archive Intrusion Detection, 2005, Master of Computer Science dissertation, Carleton University.

White-paper—BehavioMobile: Applying the behaviosec technology for multilayered mobile security, retrieved from http://behaviosec.com/wp-content/uploads/2012/10/whitepaper-behaviomobile.pdf, 2012, BehavioSec.

Hirishima, SkipLock, retrieved from http://benhirashima.com/skiplock/, Dec. 7, 2016 www.benhirashima.com.

Rice, Android Jelly Bean's Face Unlock "Liveness Check" Circumvented With Simple Photo Editing, retrieved from http://www.androidpolice.com/2012/08/03/android-jelly-beans-face-unlock-liveness-check-circumvented-with-simple-photo-editing/, Android Police.

Etherington, Apple Patents IR Tech For Detecting The Force Of Touch Input On iPads And iPhones, https://techcrunch.com/2014/04/03/apple-patents-ir-tech-for-detecting-the-force-of-touch-input-on-ipads-and-iphones/ retrieved on Dec. 7, 2016, TechCrunch.

White paper: Third Party Verification of Eyeprint Accuracy, Eyeverify, www.eyeverify.com, Apr. 2013, EyeVerify.

Samsung Galaxy S-5, Capturing Lifetime Moments, www.samsung.com, Jun. 2014, Samsung.

Android 4.0 (Ice Cream Sandwich), www.android.com, Jun. 2014, Android.

Behavio Gesture Lock User Guide dated Sep. 7, 2011, pp. 1-11, BehavioMetrics AB.

Behavio Gesture Lock 3.O.8., 2012, http://learn-the-figures.android.informer.com/3.0.8/, 2012.

ISR and Written Opinion in PCT/CA2013/050295 dated Aug. 19, 2013.

* cited by examiner

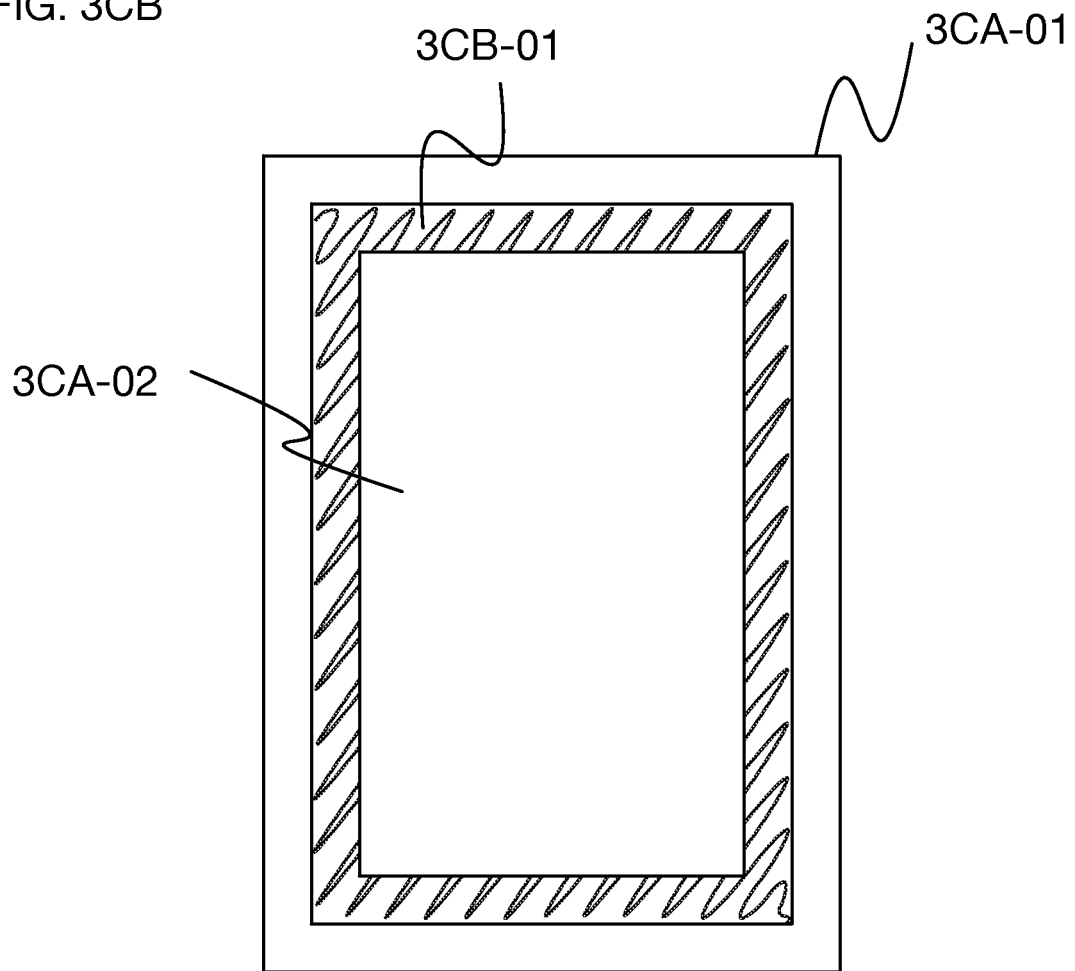

CONTEXT-DEPENDENT AUTHENTICATION SYSTEM, METHOD AND DEVICE

CROSS REFERENCE TO RELATED APPLICATIONS

This application is a continuation of and claims priority to U.S. patent application Ser. No. 15/447,253 entitled "CONTEXT-DEPENDENT AUTHENTICATION SYSTEM, METHOD AND DEVICE" filed Mar. 2, 2017, which is a continuation-in-part and claims priority to, International Application No. PCT/CA2013/050295, filed Apr. 17, 2013, which claims the benefit of U.S. Provisional Application No. 61/625,112, filed Apr. 17, 2012. This application also claims the benefit of U.S. Provisional Application No. 61/978,635, filed Apr. 11, 2014, and U.S. Provisional Application No. 61/869,972, filed Aug. 26, 2013, all of which are incorporated herein by reference in their entireties.

FIELD OF THE INVENTION

The present disclosure relates to a system, method and device for context-dependent authentication.

BACKGROUND

Authentication is an integral aspect of many different systems, for example, social media networks, email systems, payment systems, mobile commerce systems and so on.

Fraudulent use of a user's identity and improper access has massive associated costs and other implications. For example, credit card fraud costs banks time, money and has become an increased problem with cyber-crime, phishing schemes, and other programs designed to take advantage of fraudulent credit cards or means for payment.

Additionally, due to the scale of card fraud, issuing banks tend to implement quite aggressive strategies in order to combat the problem. This, however, leads to high false positive rates that cause extreme inconveniences to cardholders and merchants resulting in high operational costs (including resolution management) to the issuer. As an additional consequence, high volumes of false positives may also prevent the issuer from declining further transactions, leading to additional losses.

Existing risk-engine strategies do not have the benefit of information on user generated information (including online complaints regarding merchants, hidden charges, billing errors) and the real-time status of the cardholder, they are not well suited to cross-border transactions where behavioral and historical patterns do not fit the norm.

Moreover, without verification in real time at the point of sale between the various players in the ecosystem (e.g., banks, card companies, merchants, consumers), real-time fraud detection/prevention has been challenging, to enable effectively.

Therefore, there is a need for a new solution whereby all parties to the financial ecosystem may benefit from user generated information and real time verification.

Similarly, new authentication solutions are similarly required for many other applications to tackle the costs due to fraudulent use. For example, the cost of someone "hacking" a social media account such as a Facebook™ or a Twitter™ account could be destroyed relationships and diminished revenue in the case of a corporate social media account.

This background information is provided to reveal information believed by the applicant to be of possible relevance to the present invention. No admission is necessarily intended, nor should be construed, that any of the preceding information constitutes prior art against the present invention.

BRIEF SUMMARY

An object of the present invention is to provide a method for authenticating a user using a user device connected to a communications network, the method comprising an implicit phase, wherein said implicit phase comprises performing at least one task within a workflow, said at least one task necessary to move forward within said workflow; storing information associated with said performing of at least one task; comparing said stored information with a stored user profile; and determining whether said authentication of said user is successful or unsuccessful based on said comparing.

A method for authenticating a user using a user device, wherein said method comprises recording information associated with a plurality of characteristics, further wherein said plurality of characteristics comprise one or more kinetic motions performed as part of one or more tasks, comparing information associated with the performance of the one or more kinetic motions to that stored within a user profile corresponding to the user; and determining whether said authentication of said user is successful or unsuccessful based on said comparing.

A method for identifying a user from among a plurality of users sharing a user device, wherein said method comprises recording information associated with a plurality of characteristics; further wherein said plurality of characteristics comprise one or more kinetic motions performed by the plurality of users as part of one or more tasks; comparing information associated with the performance of the one or more kinetic motions to that stored within a plurality of user profiles, each of the plurality of user profiles corresponding to one of the plurality of users; and identifying which of the plurality of users are using the device based on said comparing.

BRIEF DESCRIPTION OF THE DRAWINGS

The foregoing and other advantages of the disclosure will become apparent upon reading the following detailed description and upon reference to the drawings.

FIGS. 3CA and 3CB show an embodiment of a interface for performing tasks for implicit authentication.

Figure 1:
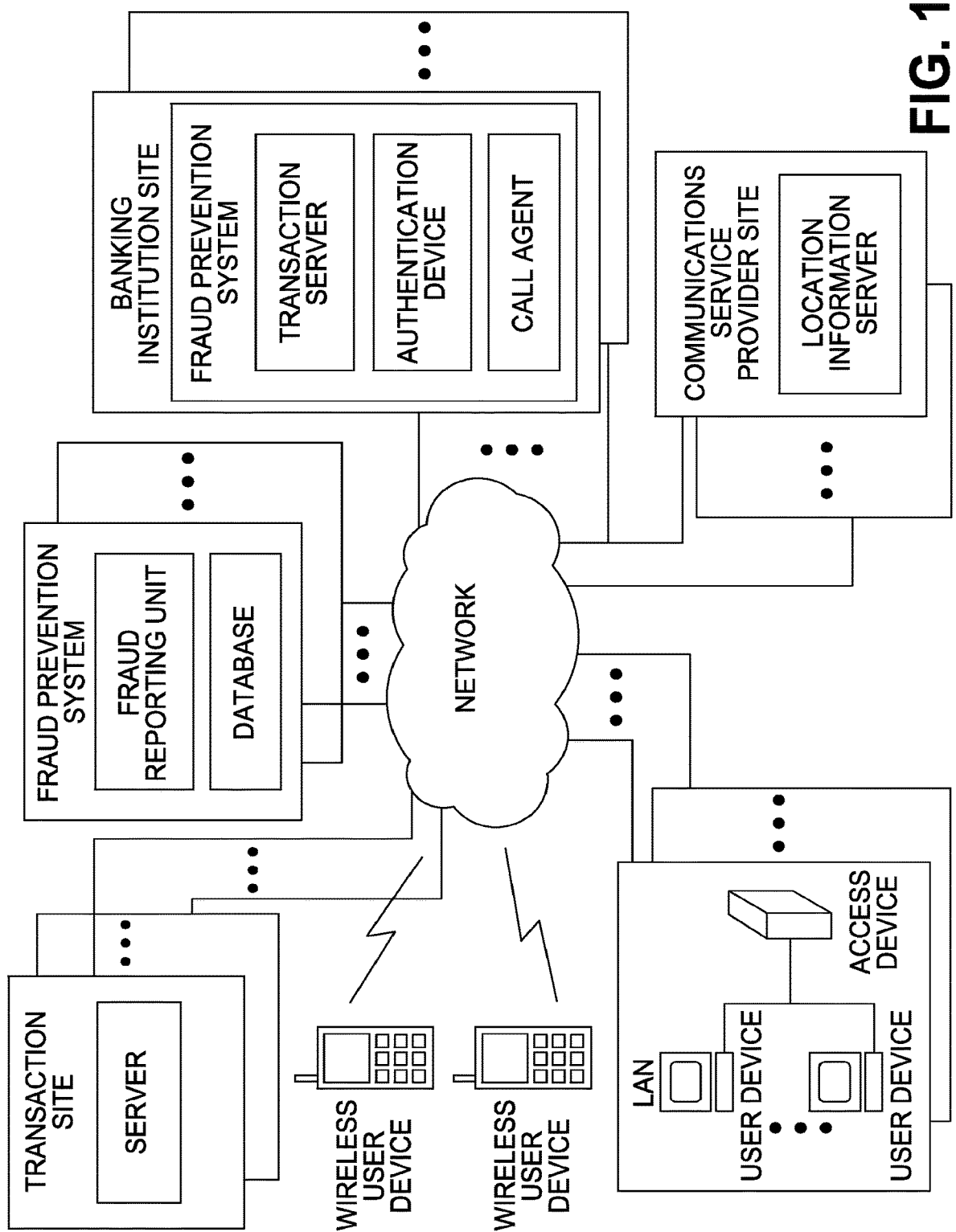
FIG. 1 illustrates a network communications system in which implemented is a fraud prevention system for transactions, in accordance with an embodiment.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Unless defined otherwise, all technical and scientific terms used herein have the same meaning as commonly understood by one of ordinary skill in the art to which this invention belongs.

The present invention provides a context-dependent authentication system and method including a financial fraud detection and resolution management system, method, system, and device which analyze a variety of dynamic user-specific characteristics to authenticate a user to perform operations such as authorizing financial transactions, logging into a social media website or hosted webmail service.

System Overview

While specific examples relating to financial transactions are presented below, many of the features presented below can be generalized to other applications where authentication is required.

User context is information that can be used to characterize the user. User context includes a variety of aspects specific to the user, such as locational aspects, social aspects, physical aspects, psychological aspects and so on.

Referring to FIG. 1, shown is a network communications system in which implemented is a fraud prevention system for transactions, in accordance with an embodiment. The network communications system may include communications service provider sites, banking institution sites, fraud reporting centers, LANs (Local Area Networks), transaction sites, and wireless user devices coupled to a network. Only two communications service provider sites, two banking institution sites, two fraud reporting centers, two LANs, two transaction sites, and two wireless user devices are shown for illustrative purposes.

More generally, the network communications system has one or more communications service provider sites, one or more banking institution sites, one or more fraud reporting centers, one or more LANs, one or more transaction sites, and one or more wireless user devices. In some implementations, one or more of the banking institution sites includes a fraud reporting/detection center or a fraud reporting/detection unit. Each banking institution site includes a fraud prevention system having a transaction server, an authentication device and a call agent. Each fraud reporting center includes a database and a fraud reporting unit. In one embodiment, the fraud reporting unit comprises a fraud detection server. Each LAN includes a plurality of user device and an access point. Each communications service provider site has a location information server. Each transaction site includes a server. The network allows communications between the wireless user devices, the transaction servers, the authentication devices, and the call agents at the fraud prevention systems, the location information servers at the communications service provider sites, the user devices and access points at the LANs, the servers at the transaction sites, and the fraud reporting units of the fraud detection centers to communicate with each other through wired and wireless communications.

The network includes a combination of one or more cellular networks and one or more wired telephony networks and the Internet, for example.

The system demonstrated above in FIG. 1 can be generalized for use in other cases. For example, in one embodiment, one or more service provider sites such as, for example, social media sites or hosted email sites, could be used in place of the one or more banking institution sites. In some embodiments, one or more of the components of FIG. 1 are co-located with each other. For example, in one embodiment, the one or more transaction sites are co-located with the one or more service provider sites and the one or more fraud reporting centers. In another embodiment, the one or more transaction sites are co-located with the one or more service provider sites.

User Devices and User Specific Information

The user devices are used to perform a variety of different functions. In one embodiment, the user devices are used to access a user's social media account such as a Facebook™ or Twitter™ account. In another embodiment, the user devices are used to access a user's webmail account. In one embodiment, the user devices have one or more mobile applications installed on them which enable the performance of these one or more different functions.

In one embodiment, the user devices are used to perform financial transactions, such as online banking transactions, credit card and debit card, ATM, PoS (Point-of-Sale), eCommerce, and remote access transactions for example. Such transactions are carried out by the servers at the transaction sites of FIG. 1. More generally, the transactions include transactions requiring security such as transactions for commerce and payments, for example.

A user device may be any device capable of network access. This device may be either wired or wireless. In some embodiments, the device may include a personal computer, tablet, mobile device, mobile phone, television, music player, personal organizer, or any similar electronic network enabled device. In some embodiments, the user device may be wearable technology including, but not limited to, jewelry (e.g., earrings, bracelets, bands, necklaces), piercings (e.g., subcutaneous or not, in essentially any part of the body), watches, glasses, hats, clothing (e.g., male and female underwear, pants, dresses, shirts, sweater, jacket), shoes, socks—essentially anything that is placed on or in a person can potentially include electronics and network enablement. In some embodiments, the user device may include an interface for accepting credit card payment or debit payments at a business for example.

In one embodiment, a user using one of the user devices or wireless user devices may initiate a transaction, and the transaction is initiated through one of the fraud prevention systems. More particularly, context-dependent systems such as the fraud prevention and authentication systems detailed below make use of user specific information to determine the context of a user so as to authenticate a user. User specific information includes one or more identifiable characteristics of the user. User specific information includes, but is not limited to, location of the user relative to the server (e.g., GPS on mobile devices may be utilized to extract location data), user behavioral analytics of mobile device (e.g., keystroke frequency, application tendency, call history), biometric analytics (e.g., voice verification, fingerprint verification, retina verification), device contextual checks, network intelligence (e.g., detection of call forwarding, phone type, post-paid/pre-paid, landline, VOIP, spoofing, SIM swaps, VPN, proxy), and information extracted from crowdsourced information (e.g., scouring social media feeds such as FourSquare® or Twitter® to search for locational information or general commentary, complaints, peer-to-peer interactions).

Each of the previously mentioned characteristics may be used in any combination thereof to combine information in order to generate a higher probability of confirming the identity of the user at the point of transaction. For example, location based information may be used with behavioral monitoring to raise a flag that user has not been in a certain store for the last 12 months yet wishes to purchase from this specific location. These characteristics are used at the authentication stage in a process utilizing dynamic weights assigned to each of the user specific characteristics to determine whether the sum weighted score meets the threshold required in order to achieve valid authentication and process the financial transaction.

With respect to the location user specific information, a user's location may be extracted from user's mobile GPS, user's IP address, carrier API, cellular triangulations, social network data mining, CCTV surveillance, satellite monitoring, among other location based identifiers.

In some embodiments, location analysis may be multi-faceted and implemented as follows: retrieving first location of transaction (e.g., merchant), retrieving second location of User's mobile, retrieving third location of user's tweet (via Twitter® API) based on time/age, retrieving forth location of user's Facebook® status update based on time/age, retrieving fifth location of user's Foursquare® checking based on time/age, retrieving sixth location of users on CCTV and other real-time public databases, retrieving other location sources from mining the web and social media sites. These different characteristics are combined and put into the dynamic weighting analysis stage where a dynamic weighting factor is assigned to each user specific characteristic. The dynamic weighing is received from a dynamic database assigning values for each factor. It should be noted that the weights change depending on the user information received from the user.

In some embodiments, the user specific information used is the first location information of the user device provided by the user device and second location information of another user device provided by the location information server of a respective one of the communications service providers that provides communication capabilities to the user. The other user device is the user's mobile phone or any other portable device carried by the user for example. Authentication of the transaction relies on a correlation between the first and second location to validate the transaction. In some embodiments, transactions are carried out via the server at one at one of the transaction sites. Furthermore, in some implementations, the user device is located at the transaction site as the case may be in an ATM or credit/debit card payment system.

In some embodiments, the first and second devices can be the same device. Particularly, the means for payment and the mobile device may be one and the same. In some embodiments, a mobile device may be configured with credit card authorization. This may be accomplished by any means including "mobile wallet" technology where a mobile device has one or more payments means (including credit cards embedded) which is utilized with the first device location. In some embodiments, applications and operations performed using Near-Field Communication (NFC) may be considered as having the first device and second device in the same device. In some embodiments, the first device and second device may be considered mobile browser based commerce operated from the mobile device of the user. In some embodiments, it is contemplated that SIM based credit may be used on a user's mobile device for commerce. In some embodiments, it is contemplated that Peer-to-Peer transactions may be enabled over the user's device.

In other implementations the first and second devices are different devices. As mentioned previously, this is where the authenticating device and the user device exist in two discrete devices, for example a merchant credit card module and a user's mobile phone, or a retina scanner and a user's eye.

The user may be referred to as an entity and therefore may refer to the customer or the merchant.

While examples related to financial transactions are presented above, user specific information to determine user context such as location analysis can be used in various other applications as well. For example, if a user wishes to login to a social media website or a hosted webmail service using a first device, the location of a second device can be checked to see if there is a correlation between the location of the first device and the second device using the techniques outlined above. Similarly, other user specific information can also be checked.

Authentication

Generally, the authentication stage is where all the user specific information is evaluated to determine whether further verification is required, or whether an operation can proceed to further processing. For example, in a financial use case such as the transaction detailed above: The authentication stage is where all the user specific information is evaluated to determine whether further verification is required, or the transaction may proceed to processing.

The authentication stage may vary depending on application in terms of complexity and the number of factors taken into consideration.

Authentication may be provided such that the characteristics used for verification may be implemented at the authentication stage in order to produce a higher degree of security taking into account more information; or conversely, for simplicity, the additional characteristics may be left for verification if the initial characteristics do not meet the specified threshold.

Figure 2:
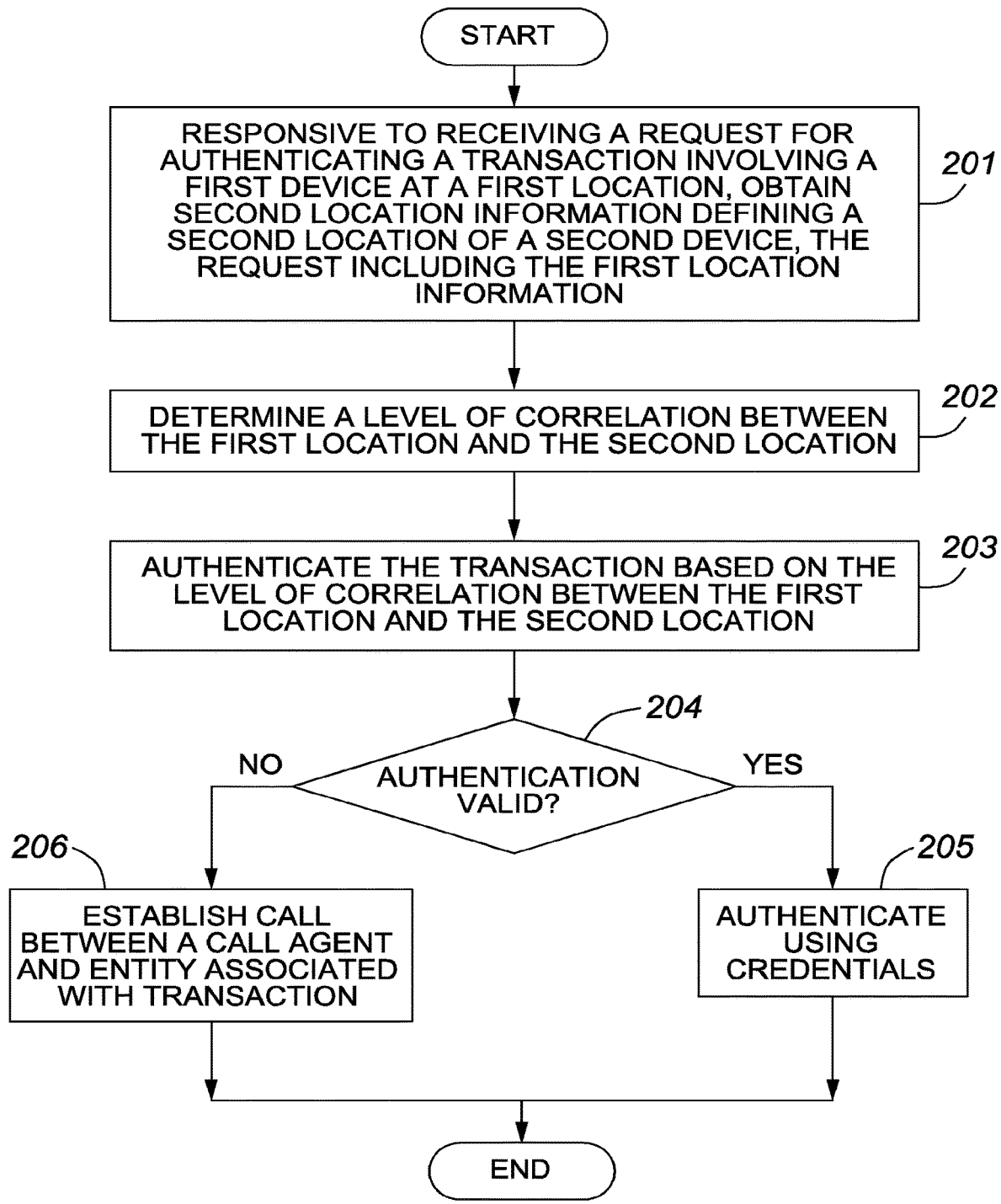
FIG. 2 is flow chart of one example of a method of authenticating a transaction in the fraud prevention system based on location criteria.

In some embodiments, location may be used as the sole initial characteristic required for authentication. Referring to FIG. 2, shown is a flow chart of a method of authenticating a transaction in the fraud prevention system of FIG. 1. In some embodiments, the method is implemented by the authentication device at any one of the banking institution sites. At step 201, in response to receiving a request for authenticating a transaction involving a first device at a first location; and second information on the location of a second device associated with the transaction is obtained. The request includes the first location information, and at step 202 a level of correlation between the first location and the second location is determined. The location information includes an IP address, latitude and longitude coordinates or a postal or ZIP code, for example. At step 203, the transaction is authenticated based on the level of correlation between the first location and the second location. The correlation must be within a defined threshold representative of the accurate distance of a mobile phone to a credit card. This threshold will vary depending on application.

If the authentication is valid at step 204, the authentication is continued at step 205 by requesting credentials from the user and processing the transaction downstream. If the user device is a mobile phone step 205 involves a call to the user device requesting user identification information and a PIN (Personal Identification Number), password, or unconstrained finger swipe for example. If the user device is a debit/credit card device at a merchant for example, the credential involve user and account information, together with an unconstrained finger swipe/PIN/password and allowing/blocking/flagging the transaction for example.

The request received at step 201 includes a phone number or a unique identifier of an entity corresponding to the user device or other device, such as a mobile phone or home phone for example, or an identifier of the user. If the authentication fails at step 204, in one embodiment, at step 206 a call between the call agent and the entity is established using the phone number or secure 2-way messaging. In some implementations, at step 206 the authentication device sends a call request to the call agent and the call agent sets up a call with the user device or other user device for further verification. The verification can use rich push notifications, an automated phone, two-way SMS (Short Message Service) messaging, voice biometric requests, or mobile phone based 'Secure Elements', such as SIM (Subscriber Identity Module) cards, SD (Storage Device) cards, or chip based cards for example.

With reference to FIG. 1 and FIG. 2, at step 201 the second location includes information obtained from the location information server at a respective one of the communications service provider sites responsible for providing communications to the second device requesting the transaction. Alternatively, in other implementations, user devices periodically registers their positions and/or changes therein with respective fraud prevention systems, and location information is obtained by retrieving relevant information from the databases at the fraud prevention systems.

In some embodiments, the authentication involves having the authentication device send information to the user device confirming the authentication. In some embodiments, GPS on the user device may provide location based information constantly, or at a specified interval. In some embodiments, retina scanners implementing biometrics at a location may scan the user's physical eye to authenticate identity and associate a user with a location. In some embodiments, the user device is measured relative to other device in close proximity, whether the other device is the authentication device or a third party device interacting with the system.

In some embodiments, the request received at step 201 includes one or more first more characteristics associated with the user device other than the second location information.

The flowchart shown in FIG. 2 is applicable in use cases other than financial transactions as well. For example, if a user wishes to authenticate himself/herself while logging into a social media website, steps 201 to 206 can also be performed.

Multi-Characteristic Authentication

Authentication may comprise the analysis of multiple characteristics to verify the identity of the individual and enable fraud detection. Each of the characteristics has a dynamic weighting such, based on circumstance such that the weighting may change in the calculation with respect to pre-defined rules. Therefore, one characteristic may have a high weighting (e.g., location obtained from IP), however, if this characteristic is in disagreement with other characteristics which are analyzed, the threshold level required for passing valid authentication may not be allowed without further scrutiny in the verification stage.

As mentioned previously, these additional characteristics include the velocity of the user device, a characteristic of environment in which the user device is in, the gait of the user, the keying speed of keys being typed in the user device, biometrics, behavioral analytics, for example. In one embodiment, this could also include, for example, one or more kinetic motions typically performed in routine tasks involving the user device. For example, if the user device is, for example Google® Glass® then a relevant kinetic motion could be that of picking up a Google® Glass® device.

In an embodiment, as explained previously the data related to the performance of these kinetic motions is compared to a user profile for the user to be authenticated. In one embodiment, the user profile is built in the following way: For a specific user, the performance of the one or more kinetic motions for a specific user can be observed over, for example, a training period. A model of the performance of the one or more motions can be established beforehand, and the observed past performance of these motions during the training period for the specific user is used to adjust the model parameters for that user. In a further embodiment, one or more learning algorithms are used to adjust the model parameters.

Then, when the routine tasks are performed, the likelihood that the user performing these tasks is the specific user can be evaluated by comparison of input data related to performance of the one or more kinetic motions which form part of the routine tasks against the user profile. An output comprising, for example, a score indicating the likelihood that the input data was produced by the specific user in question, is returned as a result of this evaluation. If this score is below a threshold because, for example, the performance of the one or more kinetic motions did not fall within certain bounds, then the authentication fails.

In a further embodiment, the one or more learning algorithms are used to learn how the user performs a task so as to distinguish between the user and an impostor. In one embodiment, the one or more learning algorithms comprise comparing the user's performance of the task with impostor or attacker attempts to imitate the user's performance of the task. In a further embodiment, a plurality of attacker/impostor models, each having one or more corresponding characteristics, is created to enable the comparison. Examples of such attacker/impostor models have been developed in the context of email system authentication in Li, Yiru et al "Securing email archives through user modeling." Computer Security Applications Conference, 21st Annual. IEEE, 2005; and Li, Yiru. "Toward Email Archive Intrusion Detection." Master of Computer Science dissertation, Carleton University, 2005; both herein incorporated by reference as if reproduced in their entirety. At least one of these models are then used to set thresholds, and make sure that said thresholds for a user are not so large as to allow malicious attacks. In a further embodiment, at least one of the attacker models are based upon empirically-derived observations of the ability of one or more people other than the user to imitate the user's actions. In another embodiment, at least one of the models are based on one or more estimates of the capabilities of hypothetical impostors. These estimates can be obtained via, for example, simulations.

In general, the one or more kinetic motions fall within the class of dynamic biometrics or behavioural biometrics, which are based upon invariants in an individual's behavior. Generally this behavior is consistent because of subconscious factors affecting how human bodies operate. Some behavioral biometrics are involuntary, such as, for example, heartbeats and brain activity. Others, such as the one or more kinetic motions described above, are voluntary. Dynamic biometrics differ from static biometrics which are based upon invariants in an individual's physical characteristics. Examples of static biometrics are, for example, fingerprints.

Behavioral biometrics have certain advantages over static biometrics. For example, using the one or more kinetic motions which are part of performing routine tasks has advantages. Firstly, since users tend to develop subconscious "muscle memory" to perform the one or more kinetic motions, a specific user is likely to perform the one or more kinetic motions consistently in a unique manner. Since the performance of the one or more kinetic motions has subconscious elements, this makes it difficult for an impostor to imitate the specific user.

Secondly, using behavioral biometrics such as making a user perform one or more kinetic motions for authentication is advantageous compared to, for example, using only biometric identifiers that persist when the user has either been killed or is seriously injured by an impostor. Liveness detection, such as checking for blinking in an image while doing facial recognition, are, in practice, insignificant barriers to determined attackers because these sensors can also be defeated using means known to those of skill in the art such as described in http://www.androidpolice.com/2012/08/03/android-jelly-beans-face-unlock-liveness-check-circumvented-with-simple-photo-editing/. Also, static biometrics can often be mimicked by impostors using relatively simple techniques known to those of skill in the art, for example, a picture of a person's face to fool a facial recognition sensor; or a latex finger to subvert a fingerprint scanner. This mimicry is fundamentally hard to stop because the primary sensor used is, essentially, a camera, and there are many ways of fooling cameras, and there are many ways of obtaining a copy of the original person's biometric data, for example, gathering fingerprints left elsewhere on a device.

Examples of the one or more kinetic motions include picking up a user device, swiping on the screen of a smartphone, pulling a user device out of a user pocket, waving a smart card within the user device near a near field communications (NFC) reader, writing with a smart pen, lifting a smart watch to read the time, eye-tracking movements, eye-winking movements, jaw movement when a user speaks, and shaking a device. While an example has been presented above with regard to Google® Glass®, this is by no means restricted to Google® Glass®. This technique can be applied to any smart device or wearable computing device or Internet-enabled device with embedded sensors.

An example is presented in the section titled "Multiple Layer Authentication" with regard to a multiple-layer authentication system, wherein one of the layers is an invisible layer. Using the one or more kinetic motions for authentication can then be incorporated into the invisible layer.

In one embodiment, the information obtained from the performance of the one or more kinetic motions are correlated with contextual information such as that obtained from non-kinetic sensors and other sources to provide more information to make accurate authentication decisions. This contextual information could also include involuntary dynamic biometrics. For example, a user might perform a kinetic motion differently when they are tired compared to when they are fresh. So, instead of returning a negative result, one step might be to find out the time before making an authentication decision. Other examples of contextual information include calendars of events, applications accessed, weather conditions based on environmental sensors on the device and location.

In one embodiment, contextual information includes information obtained as a result of processing data obtained from other sensors. For example, based on velocity and acceleration readings from sensors on the device and a calendar of events, it is determined that the user is on a train, car, bus or plane. Then this information can be correlated with the one or more kinetic motions to make accurate authentication decisions. Other examples of such determinations include determining:

Whether the device is in the user's pocket

The position of the user, that is, is the user sitting down, standing up or lying down?

If the user is talking on their phone using a headset.

In another embodiment, contextual information includes information obtained from processing involuntary dynamic biometric readings. Examples of involuntary dynamic biometric readings include:

Heartbeats based on, for example, readings obtained from a heartbeat sensor on the device, or in a system such as that described in "Analysis of human electrocardiogram for biometric recognition" by Y. Wang, F. Agrafioti, D. Hatzinakos, and K. N. Plataniotis in EURASIP journal on Advances in Signal Processing, 2008:19, 2008.

Jaw vibrations from an embedded sensor on a headset or other wearable computing device, Body temperature and heat readings from embedded infrared sensors, and Neural signals and other brain activity recorded in response to a specific visual or auditory stimulus using a system such as the ones described in "Pass-thoughts: authenticating with our minds" by J. Thorpe, P. C. van Oorschot, and Anil Somayaji in Proceedings of the 2005 workshop on New security paradigms (NSPW '05). ACM, New York, N.Y.; and "Biometrics from brain electrical activity: a machine learning approach" by R. Palaniappan and D. P. Mandic in Pattern Analysis and Machine Intelligence, IEEE Transactions on, 29(4):738-742, 2007.

Using this information has the following further advantage: These biometric readings are likely to be triggered as a result of the usage of the same subconscious "muscle memory" used to perform the one or more kinetic motions. Therefore these readings are likely to be specific to the user and are likely to be reproduced consistently every time the user performs the one or more kinetic motions.

In yet another embodiment, based on the contextual information, one or more trust levels are set. In one embodiment, said trust levels are set based on one or more trust zones. In one embodiment, said setting of trust levels and trust zones are based on the characteristics including the contextual information specified above. For example, a user denotes the user's home as a high trust zone. Since high trust zones are assigned high trust level, a high trust level is assigned to the user's home. Based on one or more characteristics and obtained contextual information, for example, IP address of a Wi-Fi connection, whether the device is used to connect to trusted Bluetooth devices, and GPS readings, the device can detect that it is at the user's home and is therefore in a high trust zone.

In a further embodiment, the stringency of the requirements for authentication depend on the level of trust. For example, in a high trust zone, the device requires less stringent authentication compared to a low trust zone. Continuing the example above, if the user is at home and the device detects it is at the user's home which is a high-trust zone, then the user need only employ a less stringent form of authentication compared to a low-trust zone, for example, a café.

In a further embodiment, the assignment of trust levels is dependent on crowdsourced information. In one embodiment, users assign different trust levels to different zones based on their personal experiences. Then, each trust zone is assigned a trust level based on, for example, the mean trust level assigned to the trust zone. In a further embodiment, the mean trust level is conditioned on one or more variables, including, for example, time of day, network used and user behavior. An example based on conditioning on time of day is as follows: Based on the time that the device is present in the zone, different trust levels are assigned. As an example, a busy coffee shop may be a great venue for impostors who are looking to observe a user entering an identifier on a device and then steal the device. Thus if the device is in the coffee shop during a busy period, the device will have more stringent authentication requirements to guard against such attacks.

In one embodiment, if authentication fails, then as described below in the section titled "Authentication Fails—Verification Required" further verification is performed.

In another embodiment, if authentication fails because the performance of the one or more kinetic motions does not fall within one or more bounds, then the anomalous performance is reported. In one embodiment, this is reported to, for example, a remote server. In another embodiment this is reported to, for example, the transaction authentication unit. Data associated with the anomalous performance such as the nature of the anomaly, time, and other information about the state of the device, such as the application that was running, and the device's location is stored.

In one embodiment, these reported anomalies are then correlated with the other contextual information to determine an appropriate response. In a further embodiment, the user has a specific policy to deal with these reported anomalies. In a further embodiment, this policy includes one or more appropriate responses to the reporting of these anomalies. Examples of appropriate responses include sending an email, sending a push notification to another device, changing the security state of the device, which could include disabling certain applications or locking the device. In the embodiment where anomalous performance is reported to the remote server, in one embodiment the device can only be unlocked by the server.

In such embodiments, at step 201 for each first characteristic a respective second characteristic associated with the user device is obtained. At step 202 for each first characteristic a respective level of correlation between the first characteristic and the respective second characteristic is determined. At step 203 the transaction is authenticated based on the respective level of correlation between each of the first characteristic and the respective second characteristic. More specifically, in some implementations the authentication fails if any one or more correlation is below a respective threshold value. However, it is to be clearly understood that other implementations are possible. For example, in some implementations the authentication fails if any N or more correlations are below respective threshold values, where N is an integer with $N \geq 1$. In other implementations the authentication fails if any M or more correlations are below respective threshold values, where M is an integer with $M \geq 2$, or if anyone or more of a subset of the correlations are below respective threshold values. It is contemplated that further subsequent characteristics may be implemented in the comparison analysis, and analysis is not limited to two characteristics.

With respect to dynamic weighing, the general operations are implemented as follows. A pre-set weighting is given to each characteristic in a database. Said database is utilized for each authentication where unless a set of programmed weighted factors are assigned to each user specific characteristic are applied into the database. For example, if location by GPS specifies a certain address, however the location via IP specifies a different address, the location authentication may reduce in weighing as different sources are in disagreement. However if there is an additional verification for location using fingerprint scanning at a credit card terminal, this may be enough to outweigh the previous ambiguity of location based on IP and GPS. This set of exhaustive combinations is held within a data-base and the rules of such may be adjusted as required.

In some implementations, some transactions do not need authentication using credentials and step 205 is not required for authentication for such transactions.

The application of multi-characteristic authentication is not just limited to financial transactions. Multi-characteristic authentication can be applied in any situation where authentication is required, such as, for example, logging into a user device, logging into one or more mobile apps installed within a user device, entering a social media website or entering a hosted webmail service.

Multiple User Authentication and Identification

In the case where multiple users share the same device, there must be a way to successfully distinguish between these multiple users. In one embodiment, multiple models of user behavior are stored. Then, the one or more kinetic motions previously specified are used both to authenticate and to identify the user. Thus when a user, such as a spouse or another family member, who is sharing the device uses the device, the device can automatically switch profiles and, potentially, security and other configuration states. For example, if a child uses the device, the email and calendar applications are disabled, but enabled when the authorized parent picks up the device. By using the one or more kinetic motions, this enables user switching to occur automatically without any explicit input from the user.

This has certain advantages. For example, if a device is shared by multiple users, a user does not have to logoff and log back on when another user uses the device. Transitions between the users incur less friction than, for example, with having to logoff and log back on.

Authentication and Communication Interface

Further details of the structure and operation of the authentication device and the user device will now be described with reference to FIG. 3A and FIG. 3B.

Figure 3A:
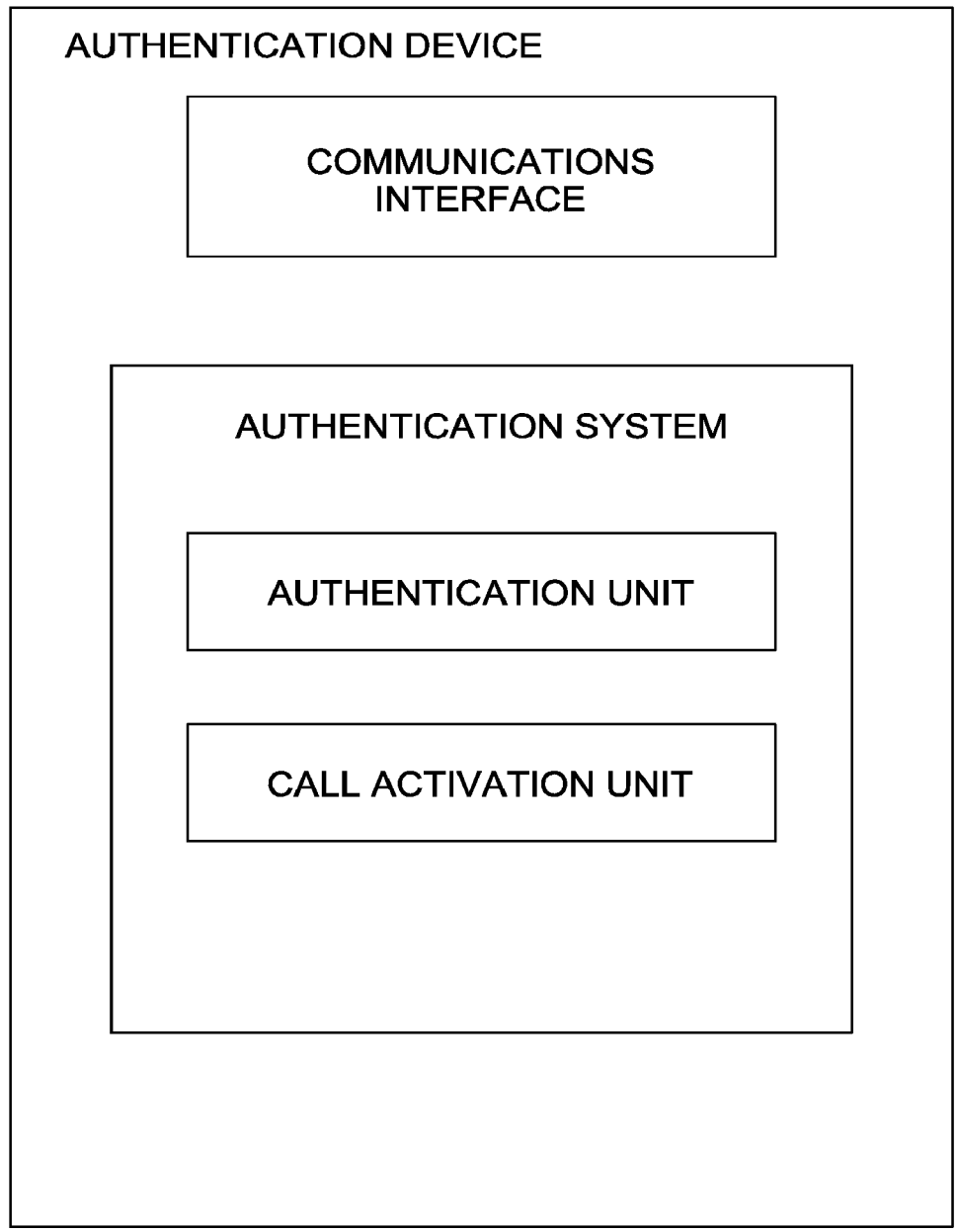
FIG. 3A is a block diagram of an example of one variety of an authentication device.

A block diagram of an example of the implementation of the authentication device of FIG. 1 is shown in FIG. 3A. The authentication device has a communications interface and an authentication system having an authentication unit and a call activation authentication unit. The communications interface provides the authentication device with the capability of communicating with other devices for purposes of receiving requests for authenticating transactions, obtaining location information from location information servers, confirming authentication, and requesting calls through a third party for verification; a call agent, for example. For each request received, the authentication unit obtains second location information defining a second location of another user device associated with the transaction. The authentication unit also determines a level of correlation between the first location and the second location and authenticates the transaction based on the level of correlation between the first location and the second location. When authentication fails the authentication unit makes a request to the call activation unit for a call to be established between the third party (e.g., call agent) and the first or second device so that failure of authentication can be reported and to resolve the problem, if possible.

In FIG. 3A, the functionality of each of the communications interface and the authentication system and its authentication unit and call activation unit can be implemented using any suitable combination of software, hardware, and firmware.

Figure 3B:
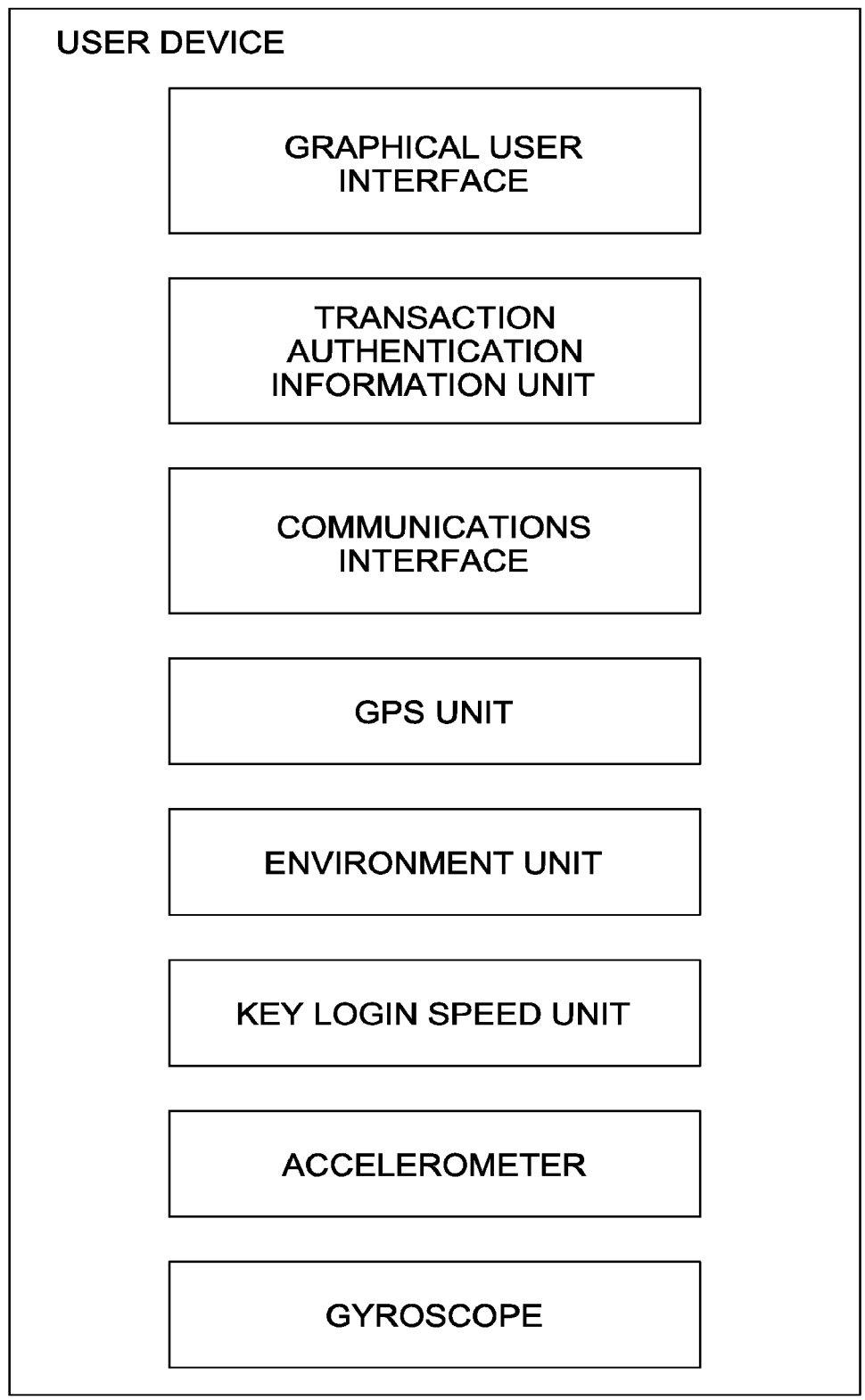
FIG. 3B is block diagram of an example of one variety of a user device.

Referring to FIG. 3B, shown is block diagram of a user device of FIG. 1. The user device has a number of features well suited for use in a wireless user device such as a mobile phone for example, and it is to be clearly understood that some of the features described below are optional. The user device has a graphical user interface, a transaction authentication information unit or more generally, an operation authentication unit, a communication interface, a GPS (Global Positioning System) unit, an environment unit, a key login speed unit, a gyroscope, and an accelerometer. The user device could also include other sensors, such as pressure sensors to detect force on the touch screen of a smartphone or tablet. An example of such a sensor is described in, for example, "Apple Patents IR Tech For Detecting The Force Of Touch Input On iPads And iPhones" posted Apr. 3, 2014 and retrieved from http://techcrunch.com/2014/04/03/apple-patents-ir-tech-for-detecting-the-force-of-touch-input-on-ipads-and-iphones/ on Apr. 9, 2014 and herein incorporated by reference as if reproduced in its entirety. The sensor and technology underlying the sensor is further described in detail in US Patent Application 2014/0092052 to Grunthaner et al herein incorporated by reference as if reproduced in its entirety. The user interface provides the user with the ability to enter and view information and includes a keyboard and display for example.

The communications interface allows the user device to communicate with other devices and servers in a network communications system. In some embodiments, the GPS unit provides position and velocity information for use in the authentication process. The environment unit may provide information on environmental conditions such as temperature and wind speed and/or velocity, for example. The key login speed unit monitors the speed at which login information is keyed in. The transaction authentication unit communicates with the GPS unit to receive location and/or speed information on the user device. The transaction authentication unit communicates with the environment unit to receive information on environmental conditions at the location of the user device. In addition, the transaction authentication unit communicates with the key login speed unit to receive information on the speed of key logins in order to differentiate between manual and automated logins. The transaction authentication unit communicates with the gyroscope and the accelerometer to receive information for determining gaiting of the user and acceleration of the user/device. The transaction authentication unit also communicates with other sensors that are on the user device of FIG. 3B. The transaction authentication unit also communicates with the graphical user interface to provide a GUI (Graphical User Interface) for displaying information relevant to the authentication process and for user input of information required for input by the user.

In one embodiment, the authentication systems are implemented within the user device using, for example, the transaction authentication information unit of FIG. 3B or more generally the operation authentication unit, as previously explained. In another embodiment, the authentication systems are implemented using a cloud-based service. An example of such an implementation is an app running on the user device together with one or more components of the user device, and one or more other components shown in FIG. 1, such as the fraud reporting center. Then, the transaction authentication unit, or more generally the operation authentication client, forwards the information obtained from the sensors to the one or more other components shown in FIG. 1, such as the fraud reporting center. The one or more other components shown in FIG. 1 are collectively known as the authentication server. The authentication server takes as input the data from the transaction authentication unit and the specific user the transaction authentication unit is attempting to authenticate, and returns as output a score indicating the likelihood that the input data was produced by the specific user in question.

In one embodiment, to accomplish this, the authentication server communicates with an authentication engine. In one embodiment, the authentication engine is implemented within one of the one or more components of FIG. 1 or implemented in a distributed fashion over the one or more components of FIG. 1. The user model or user profile is stored within, for example, a persistent storage system. Such a persistent store is located, for example, in a database such as that within the fraud reporting center of FIG. 1. The authentication engine retrieves the user profile from storage, and uses this information to compute the likelihood that the user performing the tasks is the specific user.

In the case where the authentication systems are implemented within the user device, the authentication engine is implemented within the user device. The user profile is stored within the user device as well.

An example of this is for a swipe. When a user swipes across the screen, each sensor generates a time series; the touch screen time series represents the cartesian co-ordinates of the swipe across the screen at different time intervals, sensors such as those described in "Apple Patents IR Tech For Detecting The Force Of Touch Input On iPads And iPhones" posted Apr. 3, 2014 and retrieved from http://techcrunch.com/2014/04/03/apple-patents-ir-tech-for-detecting-the-force-of-touch-input-on-ipads-and-iphones/ on Apr. 9, 2014 and US Patent Application 2014/0092052 to Grunthaner et al provide swipe force information; and the accelerometer and gyroscope time series represent the motion of the phone in 3-dimensional space while the swipe is being performed across the screen. This time series data is then used by the authentication engine to construct a set of features to be stored in the user profile in order to represent a swipe. Then, when the user performs a swipe in the future, the data from the swipe is used as an input, and compared by the authentication engine against the stored set of features in the user profile to compute a likelihood score.

In another embodiment, as explained previously, if authentication fails because the performance of the one or more kinetic motions does not fall within one or more bounds, then the anomalous performance is reported to, for example, the authentication server. Data associated with the anomalous performance such as the nature of the anomaly, time, and other information about the state of the device, say the application that was running and the device's location is stored in, for example, a database such as that located in the fraud reporting center of FIG. 1.

In one embodiment, as previously explained these reported anomalies are then correlated with the other contextual information to determine an appropriate response. Such a correlation can be performed by, for example, the authentication engine. In one embodiment, implementation of one or more appropriate responses in line with a user specific policy to deal with these reported anomalies is performed by the authentication server. Examples of such appropriate responses have been discussed previously.

As described in the section titled "Multiple User Authentication and Identification", there are embodiments where multiple models of user behavior are stored to enable distinction in the case of multiple users sharing the same device. In one embodiment, the implementation of such a multiple user authentication system as described previously is performed by the transaction authentication unit on the user device together with the authentication server. In another embodiment, the implementation of the multiple user authentication system is performed by transaction authentication unit on the user device.

In FIG. 3B, the functionality of each of the graphical user interface, the transaction authentication unit, the communications interface, the GPS unit, the environment unit and the key login speed unit can be implemented using any suitable combination of suitable software, hardware, and firmware.

The authentication device described in FIG. 3A and the user device described in FIG. 3B are applicable to a variety of use cases and not just limited to financial transactions. The transaction authentication unit or more generally the operation authentication unit can be adapted for use in a variety of use cases, including, for example, logging into a social media website or hosted webmail service. In one embodiment, the functionality contained within the operation authentication unit is used to control access to the user device itself. In another embodiment, the operation authentication unit communicates with one or more mobile applications installed on the user device to control access to the user device itself. In yet another embodiment, the operation authentication unit is used to control access to the one or more mobile applications installed on the user device.

Multiple Layer Authentication

Figure 3C:
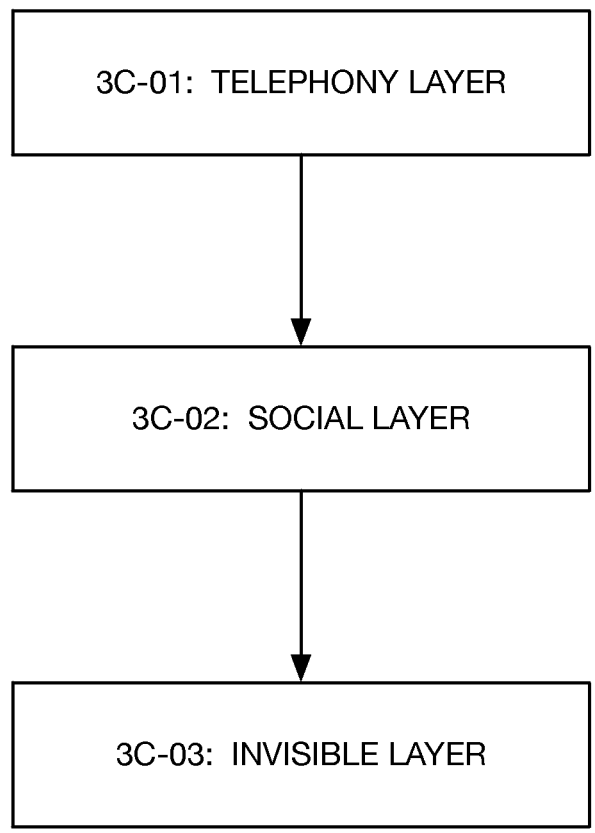
FIG. 3C shows one embodiment of a multi-layered authentication system.
Figure 3C:
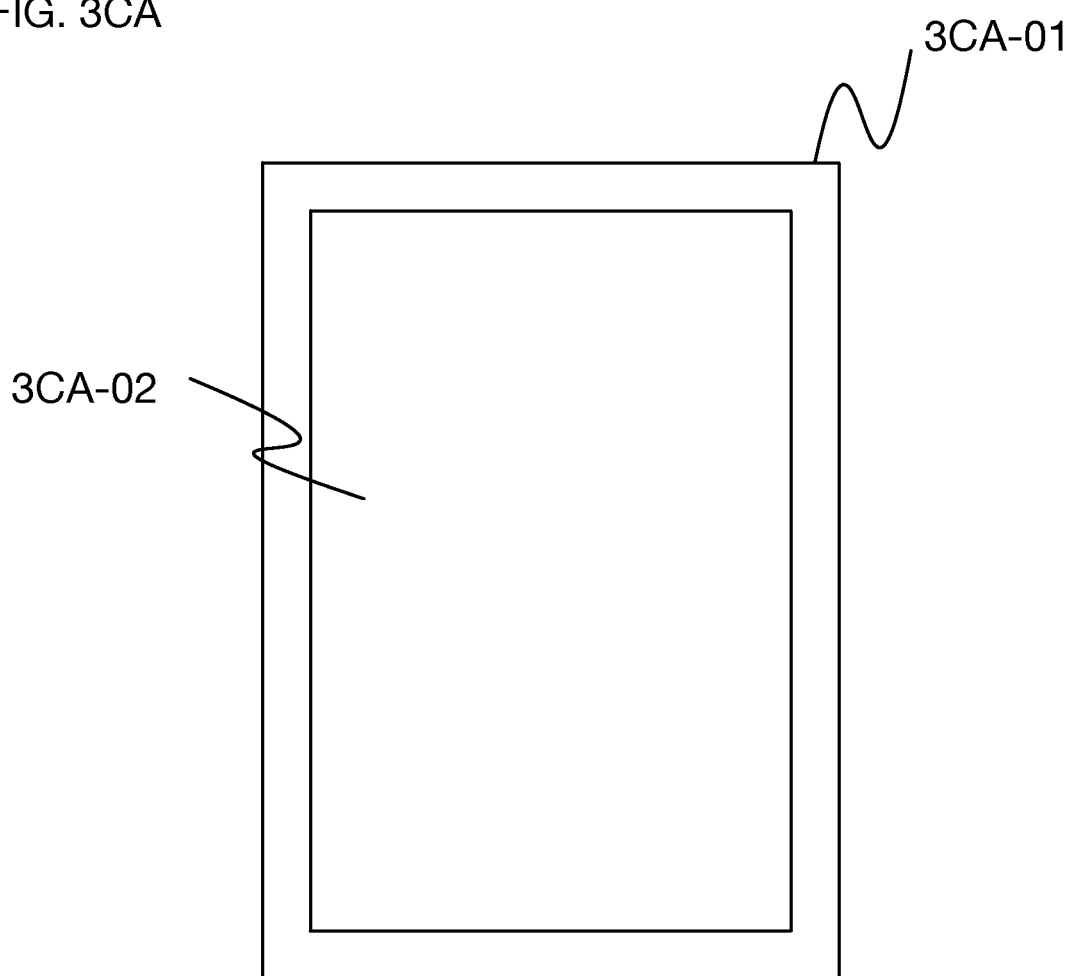

In another embodiment, the multi-characteristic authentication described above is implemented in a multi-layered fashion. An example is shown in FIG. 3C. The multi-layered implementation can be used in a variety of use cases where authentication is required. This could include, for example, controlling access to the user device itself or controlling access to one or more mobile applications installed on the user device.

Layer 3C-01 is the telephony or more broadly the telecommunications layer. This layer encompasses processing of the telephony aspects of the user-specific information associated with the user device of FIG. 1 for authentication. The telephony aspects encompass, for example, telephony-based user specific information used to identify location, such as, for example, the characteristics of the telecommunications network serving the user device. This includes, for example, network topology and changes to network topology, such as, for example, changes in locations of cell towers. In one embodiment, such information is supplied by, for example, one or more of the communications service provider sites, and specifically by the one or more location information servers within the communications service provider sites, as previously explained.

In an additional embodiment, the processing of the telecommunications-related information explained above to perform proximity correlation are also included within layer 3C-01. This includes, for example, one or more of information such as correlation of the user's mobile GPS, user's IP address, carrier API, cellular triangulations, CCTV surveillance, satellite monitoring, among other location based identifiers.

In a further embodiment, other network intelligence, such as detection of call forwarding, detection of phone type, whether the user is using a post-paid or a pre-paid account, whether a landline is being used, Voice over IP (VoIP) parameters, spoofing, SIM swaps, VPN usage, proxy usage characteristics is also used.

Layer 3C-02 is the social layer. This layer encompasses processing of the user-specific information related to the user's social interactions for authentication. In one embodiment, this information includes, for example, information related to social media interactions, such as interaction with social media websites such as Facebook®, Twitter®, Pinterest®, Foursquare® and Google Plus®. In one embodiment, this layer includes scouring of this information to obtain merchant store locations as well.

In a further embodiment, advanced data mining and analytics information used to identify suspicious merchants and suspicious transactions are also part of this social layer.

In yet another embodiment, extraction of information from crowdsourced user knowledge obtained by, for example, scouring social media feeds such as FourSquare® or Twitter® to search for locational information or general commentary, complaints, peer-to-peer interactions are also part of this social layer.

Layer 3C-03 is the invisible layer. This comprises processing of user-specific information related to the user device for authentication. In one embodiment, the invisible layer is implemented in hardware. In an exemplary embodiment, a user device has one or more external authentication devices such as "smart" screen protectors; or smart screens with embedded invisible sensors, or other sensors attached to the device. In a further embodiment, these one or more external authentication devices are coupled to one or more of the components of the user device as shown in FIG. 3B such as, for example, the graphical user interface, the transaction authentication unit, the communication interface, the GPS unit, the environment unit, the key login speed unit, the gyroscope and accelerometer. These add-on devices could be used to extract information, such as, for example, biometric information such as gait information, fingerprint information, gesture-based information such as touchscreen swipes and so on. An example of such a smart screen with embedded sensors is provided in U.S. patent application Ser. No. 13/743,706, published with Publication No. 2013/0181949 to Setlak et al, filed Jan. 17, 2013 and herein incorporated by reference as if reproduced in its entirety. Based on the information obtained by such sensors, user recognition can be performed.

In another embodiment, the invisible layer is implemented in software. The functionalities of the components of the user device of FIG. 3B have previously been explained, in particular the functioning of the transaction authentication unit/operation authentication unit. In one embodiment, as part of the invisible layer, one or more applications are installed on the device to work together with the components of the user device of FIG. 3B in order to assist the transaction authentication unit/operation authentication unit in performing identifications. These applications perform operations such as, for example, recording gestures made on the user interface. An example of such an application is the Behavio Gesture Lock further detailed at https://play.google.com/store/apps/details?id=com.behaviosec.BehavioGestureLockDemo&hl=en retrieved Aug. 19, 2013 and "Behavio Gesture Lock: User Guide" dated Sep. 7 2011 and both herein incorporated by reference as if reproduced in their entirety.

In a further embodiment, the invisible layer is implemented using a combination of hardware and software.

In a further embodiment, the invisible layer is implemented within the user device using, for example, the transaction authentication information unit of FIG. 3B or more generally the operation authentication unit, as previously explained. In a further embodiment, the invisible layer is implemented as a cloud-based service by the user device in conjunction with one or more components of the system shown in FIG. 1, such as, for example, the fraud reporting center and the fraud prevention system.

Explicit authentication schemes which employ identifiers such as Personal Identification Numbers (PINs) or passwords, have several problems. An attacker/impostor can "shoulder surf" that is, observe the credential being inputted without the knowledge of the user, and be able to replicate it perfectly. Though shoulder surfing resistant mitigation techniques exist such as those described in "Shoulder surfing defence for recall-based graphical passwords" by N. H. Zakaria, D. Griffiths, S. Brostoff, and J. Yan in Proceedings of the Seventh Symposium on Usable Privacy and Security, page 6. ACM, 2011; these mitigation techniques typically gain this increase in security by compromising usability. Attackers/impostors can also observe smudge patterns on a screen of a device and use these to replicate identifiers.

Using implicit authentication in combination with explicit authentication can add strength to an overall authentication system. Behavioural biometric-based implicit authentication is potentially a useful component to add to an explicit authentication system, as it offers certain advantages discussed previously.

Four key requirements of a secure and usable behavioral biometric-based implicit authentication system are:

(1) Learn only on user data: While it is possible to get samples of simulated malicious behavior in a lab setting, a deployed behavioral biometric system will not have access to representative malicious behavior. It also won't have access to a representative set of other user behavior, except perhaps for offline tuning purposes. Thus a behavioral biometric should construct its model of a user's behavior based primarily (if not exclusively) on observations of that user. In machine learning terms, anomaly detection algorithms or one-class learning algorithms must be used. Many commonly-used machine learning algorithms are two or multi-class learning algorithms and therefore do not meet this requirement.

(2) Model stable observables: Within the framework of anomaly detection, it is easier to learn normal behavior if the space of possible behaviors is small. In the context of smartphones this requirement is challenging as smartphone sensors may produce a deluge of data. Further, the output of these sensors can be highly variable: for example, they vary widely depending upon the task the user is performing: navigation while driving, a tilt-controlled game, or email. In machine learning, the "curse of dimensionality" says that as the complexity of data increases, the more data is required in order to learn a model. For implicit authentication quick learning of models of user behavior and quick detection of anomalies are important. Effective implicit authentication systems, then, will filter or process their data such that they detect anomalies in "stable observables"—characteristics of the data which remain invariant, unique and act predictably over time. Known consistent phenomena which will generally produce consistent data for modeling purposes should be used.

(3) Employ lightweight, online learning algorithms: User behavior is expected to naturally change over time. Anomaly detection algorithms thus must run online so that they can constantly learn from newly observed behavior. This incremental online learning must also be computationally lightweight as it should not impose significant latency upon the user interface—the user should not have to wait for the device to decide whether an action is going to be allowed or not. Lightweight learning methods are made feasible by stable observables: the easier the learning problem, the simpler the method that can achieve good results.

(4) Be resistant to mimicry attacks: Mobile devices such as smartphones are often used in public places, where they may be lost or stolen. This means that mobile devices must consider an attack scenario not commonly considered in other authentication contexts, that is where an attacker or impostor is able to physically observe the authentication taking place. For this reason it is important for implicit authentication schemes to be resistant to mimicry, or imitation, attacks.

Many prior art behavioral biometric implicit authentication systems are continuous behavioral biometric systems. With a continuous behavioral biometric system, the behavior of the user is continually observed and modeled, with the system detecting abnormal usage patterns associated with unauthorized use on an ongoing basis. Continuous behavioral biometrics suffer from the disadvantage of observing the user is highly variable contexts simply due to continuous gathering of user behavior. For example, if the user starts playing a game on their phone, then the data obtained may be very different from the case where the user is answering emails. This may lead to less stable observables.

Another example of behavioral biometrics is task-based biometrics, where the performance of one or more tasks is observed and modelled for authentication purposes. As explained previously, such tasks would comprise one or more kinetic motions. As explained previously, task-based biometrics leverage the muscle memory users build up doing a common task. The more habitual the activity, the more likely it will be to characterize normal behavior, and consequently, the easier it will be to detect anomalies. This makes the task harder to imitate thus making it more resistant to mimicry attacks, thus meeting requirement (4). By having a learning or training phase which employs lightweight online learning algorithms, a task-based biometric system can meet requirement (1) above. By choosing an appropriate task, requirement (2) can be met, and the pitfalls of using continuous systems can be avoided.

In one embodiment, as part of the invisible layer, a task-based multiple-level authentication process is implemented. This process comprises at least one main level and a backup level. The at least one main level comprises one or more implicit authentication steps, while the backup level comprises one or more explicit authentication steps.

The implicit authentication steps comprise observing one or more user habits and/or behaviours to authenticate identity. This includes specific methods of performing one or more tasks such as standard user interactions which are necessary to move forward in a workflow. These tasks include, for example, gestures such as swiping, pinching, dragging, sliding a button on the interface of the user device, combinations of such gestures, and so on. These tasks have to be performed as part of the workflow, but the user may not necessarily realize that these tasks are used for authentication. Authentication is implicitly obtained by observing user performance of such tasks.

In additional embodiments, as described previously, the tasks could also be routine tasks involving the device, where these tasks involve one or more gestures or more broadly, kinetic motions. For example, the task may involve picking up the device, or the gait of the user, the keying speed of keys being typed in the user device and behavioral analytics. In a further embodiment, as explained previously the one or more kinetic motions are correlated with contextual information such as that obtained from non-kinetic sensors and other sources to provide more information to make accurate authentication decisions. The results of these correlations are also used. As previously discussed, other examples of contextual information include information obtained as a result of processing data obtained from other sensors, and information obtained from processing biometric readings.

In one embodiment, the tasks are performed on a special interface on, for example, a mobile device presented to the user. An example of such an interface is shown in FIGS. 3CA and 3CB. In FIG. 3CA, user device 3CA-01 displays full-size content screen 3CA-02. Content screen 3CA-02 must be dismissed so that the user can move to the next content screen. To do so, the user must press or hold on content screen 3CA-02 and then move the content screen 3CA-02 off in any two-dimensional direction with a swipe or drag action. When the user holds content screen 3CA-02, then as shown in FIG. 3CB, content screen 3CA-02 is reduced and appears within a floating overlay, and background 3CB-01 is visible. In one embodiment, background 3CB-01 is a different color from content screen 3CA-02. Content screen 3CA-02 is now an animated object which follows the motion of the user finger. In one embodiment, if the user stops holding the content screen 3CA-02 then it returns to its previous size. The user must then swipe reduced content window 3CA-02 off in any direction so as to reveal the next screen. In one embodiment, a partial swipe in any direction is enough to reveal the next screen In one embodiment, the tasks are chosen dependent upon the degree of constrainedness of such tasks. It is important that the tasks chosen for implicit authentication be:
Constrained enough so that accurate verification of a user can be performed
Unconstrained enough, so that accurate identification of a false user can be performed.

If a task is too constrained, then there is insufficient variability to distinguish between a user and an impostor. If a task is not constrained enough, then there is too much variability, necessitating that a system accept a wide range of inputs thus making it difficult to distinguish between a user and an impostor.

In one embodiment, the degree of constrainedness can be calculated for each task. Only those tasks where the degree of constrainedness falls within a certain range are used.

Figure 3D:
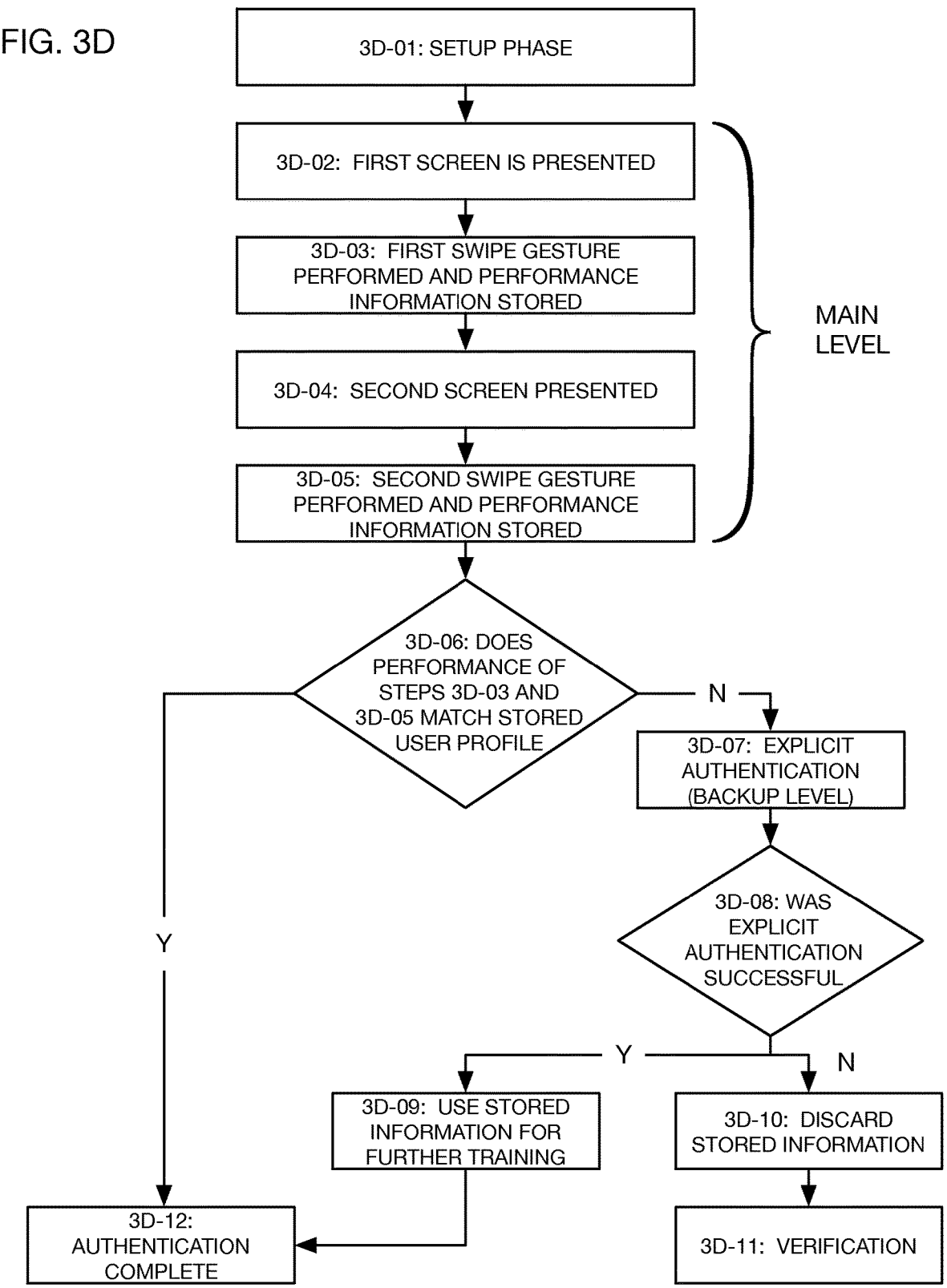
FIG. 3D shows one embodiment of a task-based multiple-level authentication process.

FIG. 3D shows one embodiment of a task-based multiple-level authentication process with one main level and a backup level. In one embodiment, the multiple-level authentication process comprises a setup phase 3D-01, where the user's habits are learnt. As previously described, the learning is implemented by, for example, prompting the user into performing the tasks which will be used in implicit authentication. The layer records the performance of these tasks, and these records are then used to "seed" or build a user profile when the user needs to actually be authenticated.

In a further embodiment, in step 3D-01, one or more learning algorithms are used to learn how the user performs a task so as to be able to distinguish between the user and an impostor. In one embodiment, the one or more learning algorithms comprise comparing the user's performance of the task with impostor or attacker attempts to imitate the user's performance of the task. In a further embodiment, a plurality of attacker/impostor models, each having one or more corresponding characteristics, is created to enable the comparison. Examples of such attacker/impostor models have been developed in the context of email system authentication in Li, Yiru et al "Securing email archives through user modeling." Computer Security Applications Conference, 21st Annual. IEEE, 2005; and Li, Yiru. "Toward Email Archive Intrusion Detection." Master of Computer Science dissertation, Carleton University, 2005; both herein incorporated by reference as if reproduced in their entirety. At least one of these models are then used to set thresholds, and make sure that said thresholds for a user are not so large as to allow malicious attacks. In a further embodiment, at least one of the attacker models are based upon empirically-derived observations of the ability of one or more people other than the user to imitate the user's actions. In another embodiment, at least one of the models are based on one or more estimates of the capabilities of hypothetical impostors. These estimates can be obtained via, for example, simulations.

Steps 3D-02 to step 3D-05 comprise the main level, which are performed every time the user needs to be authenticated. In particular, steps 3D-03 and 3D-05 involve performing a first and second task, which in this case is a swipe gesture, to dismiss the screens presented in steps 3D-02 and step 3D-04. These two steps are necessary to move forward in the workflow of FIG. 3D, however the user may not necessarily realize that the performance of these steps will be used for authentication. The information on the performance of these tasks are obtained using, for example, one or more of the hardware or software based techniques which are part of the invisible layer. The information of the user's performance of these tasks are stored within steps 3D-03 and 3D-05.

Then, in step 3D-06 the stored user's performance information is compared against the stored user profile. If there is a correlation between the user profile and the performance of these steps, then authentication is complete in step 3D-12. If there is no correlation, then the backup level is entered in 3D-07. Step 3D-07 comprises one or more explicit authentication steps, such as, for example, prompting the user to enter one or more explicit identifiers to authenticate the user, such as Personal Identification Numbers (PINs), passwords, credit card numbers, addresses, telephone numbers or email addresses.

In a further embodiment, in step 3D-08 if there is successful explicit authentication, the stored information concerning the user's performance of steps 3D-03 and 3D-05 is used for further training and building of the stored user profile in step 3D-09, and authentication is complete in step 3D-12. If the explicit authentication is unsuccessful, then the stored information concerning the user's performance of steps 3D-03 and 3D-05 is discarded in 3D-10. Optionally, in one embodiment, in step 3D-11, verification may need to be performed. Examples of verification to be performed in step 3D-10 are detailed in the section below titled "Authentication Fails—Verification Required."

In one embodiment, the process detailed in FIG. 3D is implemented within the user device by, for example, the transaction authentication information unit/operating authentication unit and one or more of the sensors shown in FIG. 3B; or by an app running on the user device together with the transaction authentication information unit/operating authentication unit and one or more of the sensors shown in FIG. 3B. In another embodiment, the process detailed in FIG. 3D is implemented as a cloud-based service using an app running on the user device together with one or more components of the user device, and one or more other components shown in FIG. 1, such as the fraud reporting center. As previously described, the one or more other components shown in FIG. 1 are collectively known as the authentication server.

In a further embodiment, if the task-based multiple-level authentication process detailed in FIG. 3D fails, in one embodiment the transaction authentication unit or more generally the operation authentication unit will communicate with other servers such as, for example, the fraud reporting unit of FIG. 1 to determine if, for example the user device has been stolen. If the device has been stolen, then in one embodiment the operation authentication unit moves sensitive data away from the user device, to a secure location such as, for example, a cloud-based storage system. Optionally, one or more apps running on the user device may be deleted.

While two task-based steps have been shown in the process detailed in FIG. 3D, there may be more or less than two task-based steps. In one embodiment, if the task-based multiple level authentication process is used to control access to one or more apps, then depending on the level of security required for each app, the requirements for implicit authentication are tightened or loosened. For example, if the app is a payment- or financial app, then naturally the security requirements are much higher, and the requirements for implicit authentication are made more difficult. This may include, for example, performing more tasks. For lower security apps, the requirements for implicit authentication may be made easier.

Figure 3E:
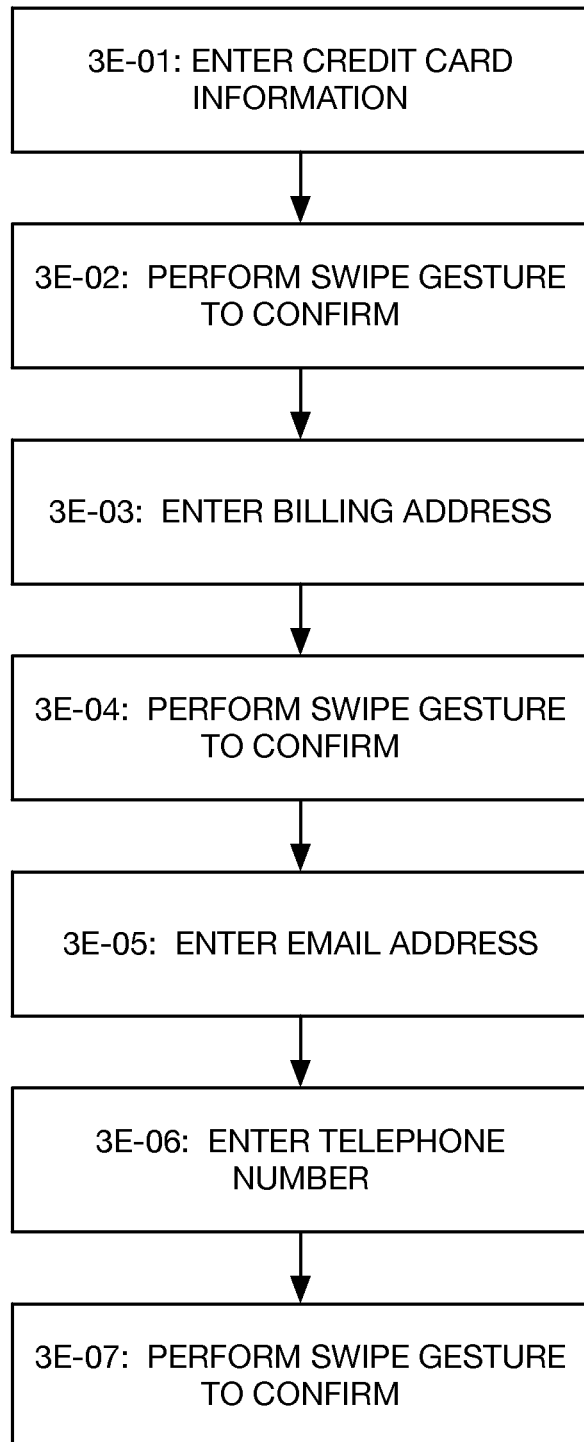
FIG. 3E shows one embodiment of a combined implicit-explicit authentication workflow.

In another embodiment, the invisible layer comprising implicit authentication, and explicit authentication are combined and incorporated into a typical authentication workflow. FIG. 3E shows a series of steps for one embodiment of such a combined implicit-explicit authentication workflow. In step 3E-01, the user enters a credit card number by, for example, using the touch screen. In step 3E-02 the user performs a task which in this case is a swipe gesture to confirm the entry. In step 3E-03, the user enters a billing address associated with the credit card. In step 3E-04 the user performs a swipe gesture to confirm the billing address. In step 3E-05 and 3E-06 the user enters an email address and telephone number respectively. In step 3E-07 the user performs a swipe gesture to confirm entry of the information in steps 3E-05 and 3E-06.

Steps 3E-01, 3E-03, 3E-05 and 3E-06 are "explicit authentication" steps. One or more of the remaining steps are designated as "implicit authentication" steps, wherein information provided by these one or more steps are used to authenticate the user.

In a further embodiment, designation of steps of a workflow as implicit authentication is dependent upon the degree of constrainedness of the task performed within such a step as explained before. In one embodiment, the degree of constrainedness can be calculated for each tasks within a workflow such as that of FIG. 3E. Then only those tasks where the degree of constrainedness falls within a certain range are designated as implicit authentication steps.

For example, steps 3E-02, 3E-04 and 3E-07 comprise the user performing the task of making swipe gestures. The information from one or more of these swipe gestures are obtained using, for example, one or more of the hardware or software based techniques which are part of the invisible layer.

In yet another embodiment, once the steps within the workflow have been designated, then the selection of steps from which data is obtained for authentication is determined on an interaction-by-interaction basis. For example, there are 7 unique combinations which can be created using the steps 3E-02, 3E-04 and 3E-07:

Combination 1: [3E-02]
Combination 2: [3E-04]
Combination 3: [3E-07]
Combination 4: [3E-02, 3E-04]
Combination 5: [3E-02, 3E-07]
Combination 6: [3E-04, 3E-07]
Combination 7: [3E-02, 3E-04, 3E-07]

For example, referring to FIG. 3E, in a first interaction, the data obtained from performing task 3E-02 and 3E-07 are used to compute a score. In a second interaction, data obtained from performing only task 3E-04 is used for authentication purposes. In a third interaction, data obtained from tasks 3E-02, 3E-04 and 3E-07 are used.

In one embodiment, the interaction-by-interaction selection is performed in a deterministic manner. For example, a sequence of combinations, such as 1-3-5-4-2-6-7 is used. Then, in the first interaction, only data from step 3E-02 corresponding to combination 1 is used for authentication. In the second interaction, only data from step 3E-07 corresponding to combination 3 is used for authentication. In the third interaction, data from steps 3E-02 and 3E-07 corresponding to combination 5 is used for authentication.

In yet another embodiment, the interaction-by-interaction selection is performed pseudo-randomly. For example, based on the output of a random number generator, one of these combinations is chosen. For example, if combination 1 is chosen, then only data from performing step 3E-02 is used for authentication.

In one embodiment, the data surrounding the user's performance of such tasks is obtained. Authentication is performed based on correlation of such historical data to the obtained data. In a further embodiment, the data from each of the steps is weighted and used to compute a score. This computed score is then compared to historical scores to assist in authenticating the user.

In a further embodiment, the historical data obtained from performing one or more such implicit authentication steps are combined with the data obtained from the explicit authentication steps to determine an accurate profile of the user, that is, training is performed. For example, every time that the user successfully executes the workflow of FIG. 3E, the data from steps 3E-02, 3E-04 and 3E-07 is stored and used for future authentication.

In a further embodiment, as described above, the stringency of the requirements for authentication depend on the level of trust. In one embodiment, information from the telephony layer 3C-01 and social layer 3C-02 and other contextual information is used to determine the trust level corresponding to a trust zone. As explained previously, trust can also be determined using crowdsourcing techniques.

In one embodiment, the stringency of the requirements is inversely related to the level of trust. For example, referring to the workflow of FIG. 3E, in one embodiment, if the user is in a high trust zone, then less of the steps of FIG. 3E are used for authentication compared to the situation when a user is in a medium trust or low trust zone.

In one embodiment, the interaction-by-interaction selection as described previously is performed using a weighted algorithm. For a high trust zone the weighting is inversely proportional to the number of steps in the combination. Therefore, a single step combination is more likely to be chosen than a 2-step combination, which in turn is more likely to be chosen than a 3-step combination. For a low trust zone, the weighting is directly proportional to the number of steps in the combination. Therefore, a single step combination is less likely to be chosen than a 2-step combination, which in turn is less likely to be chosen than a 3-step combination.

Trust-based systems have been demonstrated previously. For example, systems such as "SkipLock" created by B. Hirashima and described at http://benhirashima.com/skiplock/, retrieved Jun. 19, 2014, have focused on avoiding the use of intrusive explicit authentication mechanisms by establishing trusted areas where the identity of the user can be established with high probability based on their location. Though this approach does increase usability by bypassing onerous and intrusive explicit authentication in tightly bounded scenarios, since these approaches are entirely explicit, they do nothing to increase either the usability or the security of authentication in public settings. Furthermore, by removing all authentication in a high trust setting such as a home, it also does not help with the numerous non-traditional impostor attacks smartphones are subject to, for example, a child playing a game on a parent's work phone.

If, for example, authentication using the embodiments detailed above in FIGS. 3D and 3E fail, then in one embodiment further verification is performed, as detailed in the section below titled "Authentication Fails—Verification Required."

In a further embodiment, the information obtained from each layer of FIG. 3C is weighted differently in order to perform authentication.

While a 3-layered implementation has been described above, it is apparent to one of skill in the art that the implementation can be generalized to more than 3 layers. In addition, it is not necessary that all 3 layers are needed to perform authentication. For example, with reference to FIG. 3C, in one embodiment only layer 3C-02 (social layer) and 3C-03 (invisible layer) are used. In another embodiment, only layer 3C-03 (invisible layer) is used.

Valid Authentication—No Verification

Figure 4A:
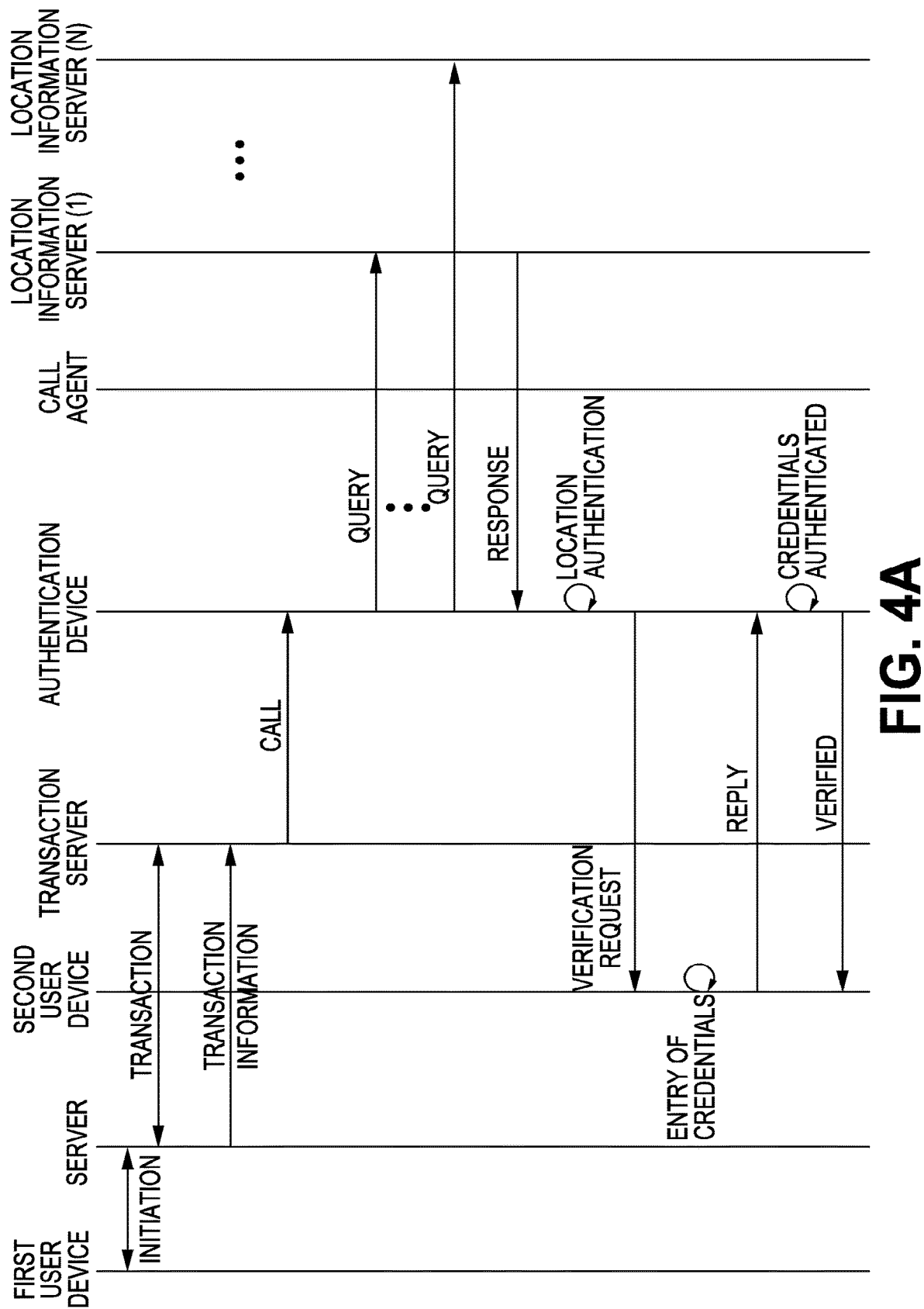
FIG. 4A is a messaging flow diagram for one embodiment of authentication of a transaction in the network communications system for a case when authentication of a transaction succeeds.

A further embodiment of valid authentication is demonstrated in FIG. 4A. Referring to FIG. 4A shown is a messaging flow diagram for an example of authentication of a transaction in the network communications system of FIG. 1 for a case when authentication of a transaction is deemed valid. A transaction between a transaction server and a server at a transaction site initiated by a user at a first user device is established. User specific information utilizing various characteristics is analyzed.

In the following example, one of the primary characteristics analyzed is location. During initiation of the transaction the user device provides first location information on the location of the first user device, and the server at the transaction site transmits transaction information necessary for the transaction to the transaction server. The information includes, among other information, the first location information on the user device, together with a phone number of the user, for example. As discussed above, in some implementations the information includes additional characteristic information related to the first user device. The transaction server calls an authentication device and the authentication device requests second location information defining the location of a second user device associated with the transaction from location information servers 1 to N, each at one of N communications service provider sites where N is an integer with N≥1. The location information server of the communications service provider that provides communications services to the second user device provides a response containing the second location information. In some implementations the authentication device is provided with an identification of the communications service provider that provides communications services to the second user device and the query is sent only to one location information server. In some embodiments, the fraud prevention system includes a fraud prevention unit, a database, as well as authentication device, third party interface (e.g., call agent), and transaction server.

Responsive to receiving the second location information, the authentication server performs location authentication by determining a level of correlation between the first location and the second location and authenticates the transaction based on the level of correlation between the first location and the second location. For example, in one implementation the authentication is valid if the distance between the first and second locations is less than 50 km; otherwise, it fails. A verification request is sent to the second user device in response to the location authentication requesting user credentials. In some implementations the user credentials include a PIN (Personal Identification Number), implicit information, or biometric information, for example. Responsive to receiving the authentication request the user credentials are entered and a reply containing the user credentials is transmitted to the authentication device. The user credentials are authenticated and the authentication device transmits a message to the second user device indicating that the authentication has been verified.

In some embodiments, the authentication is done locally on the first or second device and not transmitted; only the authentication success/failure information is transmitted.

As discussed above, in some implementations for some transactions there is no need for authentication using user credentials and in such cases there is no verification of user credentials when authentication based on location or other invisible correlation information succeeds.

In the exemplary scenario of FIG. 4A authentication of the transaction succeeds and further verification need not be applied.

Authentication Fails—Verification Required

A different scenario in which the location authentication transaction originally fails will now be described with reference to FIG. 4B. In another embodiment, as previously explained, if authentication using either the task-based multiple-level authentication process of FIG. 3D or the process of FIG. 3E fails, then at least some of the steps shown in FIG. 4B are performed.

Figure 4B:
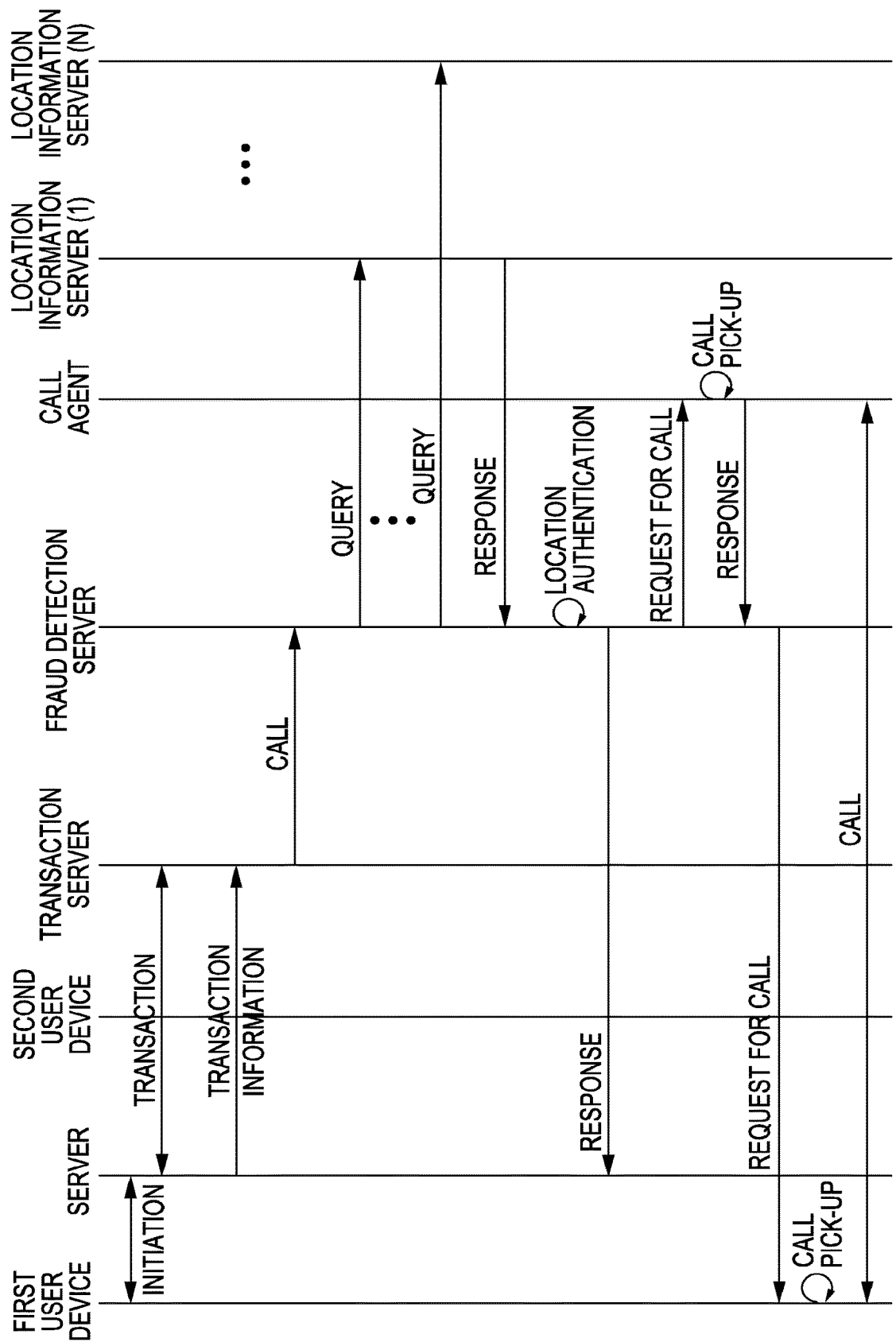
FIG. 4B is a messaging flow diagram for one embodiment for authentication of a transaction in the network communications system for a case when authentication of a transaction originally fails.

In FIG. 4B, the signaling process is similar to that of FIG. 4A up to the point where location authentication is performed. In this case the correlation between the first and second locations is not sufficiently high and results in a failed authentication during the location authentication step. In response to the failed authentication, the fraud detection server within the fraud reporting unit of the fraud reporting center sends a response to the user device with information on the failed authentication. Similarly, if either the task-based multiple-level authentication process of FIG. 3D or the process of FIG. 3E fails, the fraud detection server sends a response to the user device with information on the failed authentication.

At this point verification may be implemented to verify the identity of the individual. In some embodiments, verification includes a person to person interaction to identify an individual. In some embodiments, verification includes utilizing one or more user based characteristics not initially used for authentication.

Continuing in FIG. 4B this example implements a person to person verification by means of a call agent. The fraud detection server sends a request to a call agent for establishing a call between the call agent and the first user device. The call agent picks up the call and sends a response to the fraud detection server indicating that the call has been picked up. The fraud detection server also sends a request to the first user device for the call. The first user device picks up the call. The request contains information necessary for the first user device to establish the call with the call agent, communicates with the call agent, and the call is established. A user at the first user device and the call agent can communicate with each other to perform authentication. In one embodiment, if either the task-based multiple-level authentication process of FIG. 3D or the process of FIG. 3E fails, then person to person verification by means of a call agent as explained above takes place.

It is contemplated that multi-party third party verification may occur. For example, in a family setting, if the husband has the mobile device but the wife is using the credit card at a separate location, the third party agent may verify the authorization with both parties with consent of the cardholder. In one embodiment, if either the task-based multiple-level authentication process of FIG. 3D or the process of FIG. 3E fails, then similar multi-party third party verification occurs.

In some embodiments, the user at the first user device may be required to provide additional authentication information so that the transaction can be allowed. The additional authentication may include any of the user specific characteristics listed previously. Additionally, the information may include any one or more of the user's mother's maiden name, the user's birth date, and the name of the user's preferred pet, for example. If the user cannot provide the correct additional authentication information the transaction is refused. In one embodiment, if either the task-based multiple-level authentication process of FIG. 3D or the process of FIG. 3E fails, then the user is prompted to provide additional authentication information.

In FIG. 4B the request for a call is initiated by the fraud detection server by sending requests to both the call agent and the first user device. However, it is to be clearly understood that implementations are not limited to this particular implementation. For example, in another implementation the fraud detection server informs the call agent that a call is to be established between the call agent and the second user device, and the call agent initiates the call by sending a request to the second user device. In one embodiment, if either the task-based multiple-level authentication process of FIG. 3D or the process of FIG. 3E fails, then this process occurs.

As discussed above, the first user device at which a transaction is initiated may be a mobile phone, a personal computer, or a debit/credit card reader for example. In the case of a personal computer or a debit/credit card reader, for example, the call may be established with the user's user call device such as a mobile phone, home phone, VOIP phone, for example.

Furthermore, in some cases a transaction with the transaction server may be initiated by the user device through one or more servers. For example, a user may be at a PC (Personal Computer) and making a purchase and payment on the Internet. The servers might be controlled by merchants for example or by entities that offer Internet payment services, such as PayPal® for example. In such a case, the transaction may be conducted between a server and the transaction server. The user device communicates with the server and the server relays location information on the first user device to the transaction server. In one embodiment, if either the task-based multiple-level authentication process of FIG. 3D or the process of FIG. 3E fails, then a similar process occurs.

Figure 4C:
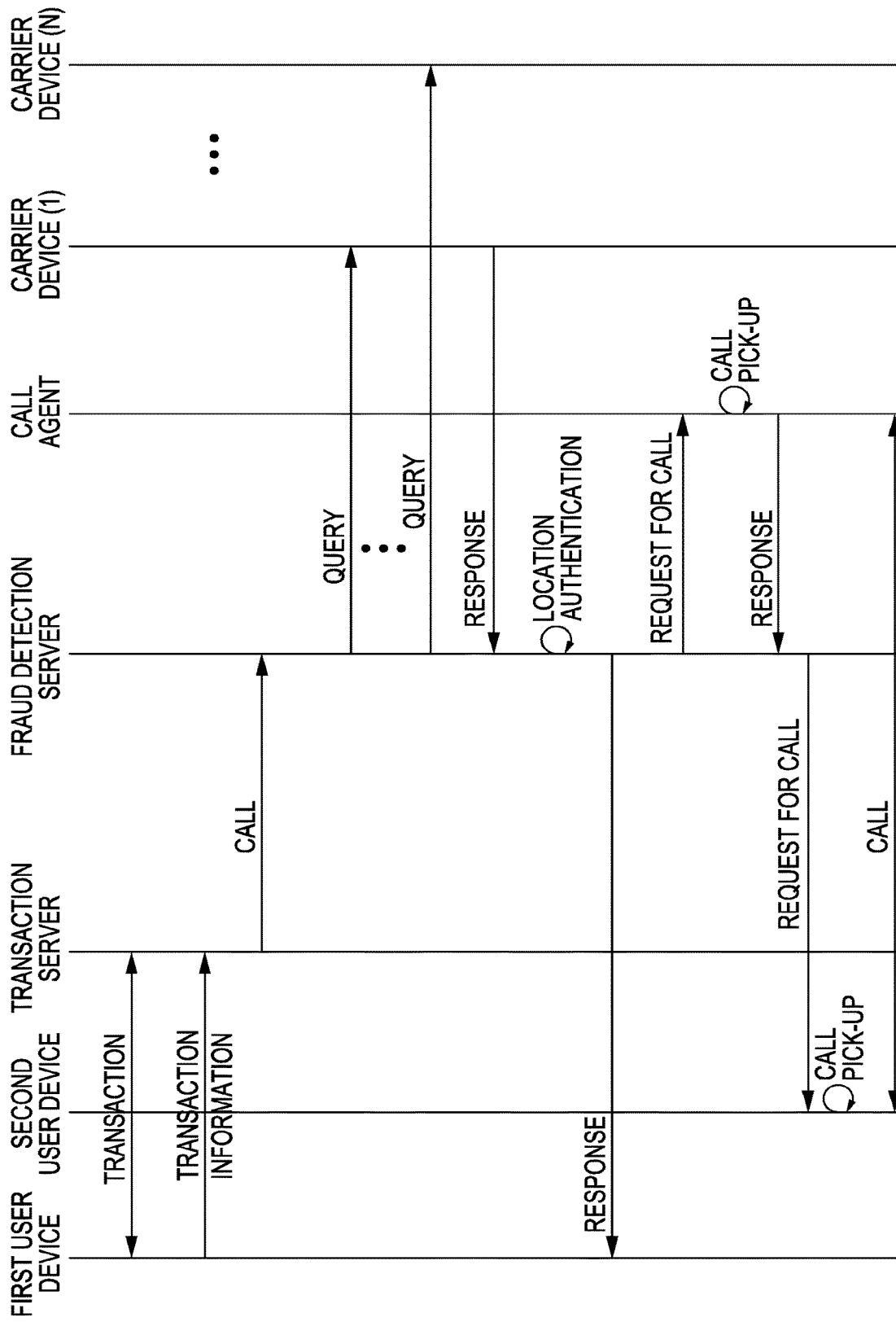
FIG. 4C is another messaging flow diagram for one embodiment of authentication of a transaction in the network communications system for a case when authentication of a transaction originally fails.

Referring to FIG. 4C, shown is another messaging flow diagram for authentication of a transaction in the network communications system of FIG. 1 for a case when authentication of a transaction originally fails. The messaging flow diagram of FIG. 4C is similar to that of FIG. 4B except that in this case upon a failed authentication, a call is established between a second user device and the call agent instead of between the first user device and the call agent. In one embodiment, if either the task-based multiple-level authentication process of FIG. 3D or the process of FIG. 3E fails, then a similar process occurs.

For example, the second user device may be a bank's landline phone system, a lending instruction's VOIP service, or an investment firm agent's mobile phone.

More particularly, in response to the failed authentication the fraud detection server sends a response to the server with information on the failed authentication. The fraud detection server also sends a request to the call agent for establishing a call between the call agent and the second user device. The call agent picks up the call and sends a response to the fraud detection server indicating that the call has been picked up. The fraud detection server also sends a request to the second user device for the call. The second user device picks up the call. The request contains information necessary for the second user device to establish the call with the call agent. The second user device communicates with the call agent and the call is established. The user at the second user device and the call agent can communicate with each other to perform authentication. For example, the user at the second user device may be required to provide additional authentication information so that the transaction can be allowed, as described above with reference to FIG. 4B. In one embodiment, if either the task-based multiple-level authentication process of FIG. 3D or the process of FIG. 3E fails, then a similar process occurs.

Previously, a process to deal with anomalous performance was detailed. The same process can be applied if the multiple-level authentication process of FIG. 3D or the process of FIG. 3E fails.

Fraud Prevention Communication System Utilizing Aggregate User Data

An additional embodiment to the invention includes the utilization of the one or more user specific characteristics to notify users of the system that certain merchants and/or specific goods or services may be suspect given previous transaction history. In this way, the system may implement a preventative fraud protection scheme. In some embodiments, the aggregation of user based transaction related data history is used as one of the specific characteristics.

Flagging Transactions at Point of Sale

An additional fraud prevention mechanism which uses a notification system can also be implemented by confirming transactions with client/user when they are underway. More particularly, the mechanism involves a method of verifying whether a transaction being conducted over a communications network is fraudulent. The transaction has associated with it transaction information and a user device for fraudulence verification.

The method involves comparing the transaction information with other information in a database to determine whether a transaction is potentially fraudulent. A request is sent to a user device requesting user credentials and confirmation information on whether the transaction is fraudulent or not. In response to receiving a response with the user credentials and the confirmation information, a determination of whether the user credentials allow access to the transaction is made and the transaction is authenticated using the confirmation information only if the user credentials allow access to the transaction. Such a mechanism will now be described in more detail with reference to FIG. 5, FIG. 6A, and FIG. 6B.

The user may flag the transaction utilizing various degrees of concern. In some embodiments, the user may flag the current transaction as "concerned" which lets the transaction through but flags the transaction for a follow up check at a later time. Alternatively, the user may flag the current transaction as "suspected fraud" where a third party (e.g., a call agent) is contacted to initiate further verification. Additionally, the user may flag the current transaction as "definitely fraud" where the transaction is blocked from proceeding and third party authorities are notified.

In some embodiments, the notifications with respect to a specific merchant or vendor are stored in a database where each of the previous flags assigned per transaction at the merchant by users of the system are saved. In this way, when a new user visits a merchant which has questionable credentials based on the database analytics within the fraud detection unit, the database will send a summary of the previous transaction flagging history to the user currently processing a transaction such that the user may take this information into account prior to proceeding with the processing of the transaction.

In some embodiments, the threshold for calculating the tolerance for suspicious activity changes with volume of transactions. Furthermore, the threshold may be set manually by the system administrator or dynamically but process given input from various data inputs (e.g., transaction information).

Fraud Prevention System Implementation

Figure 5:
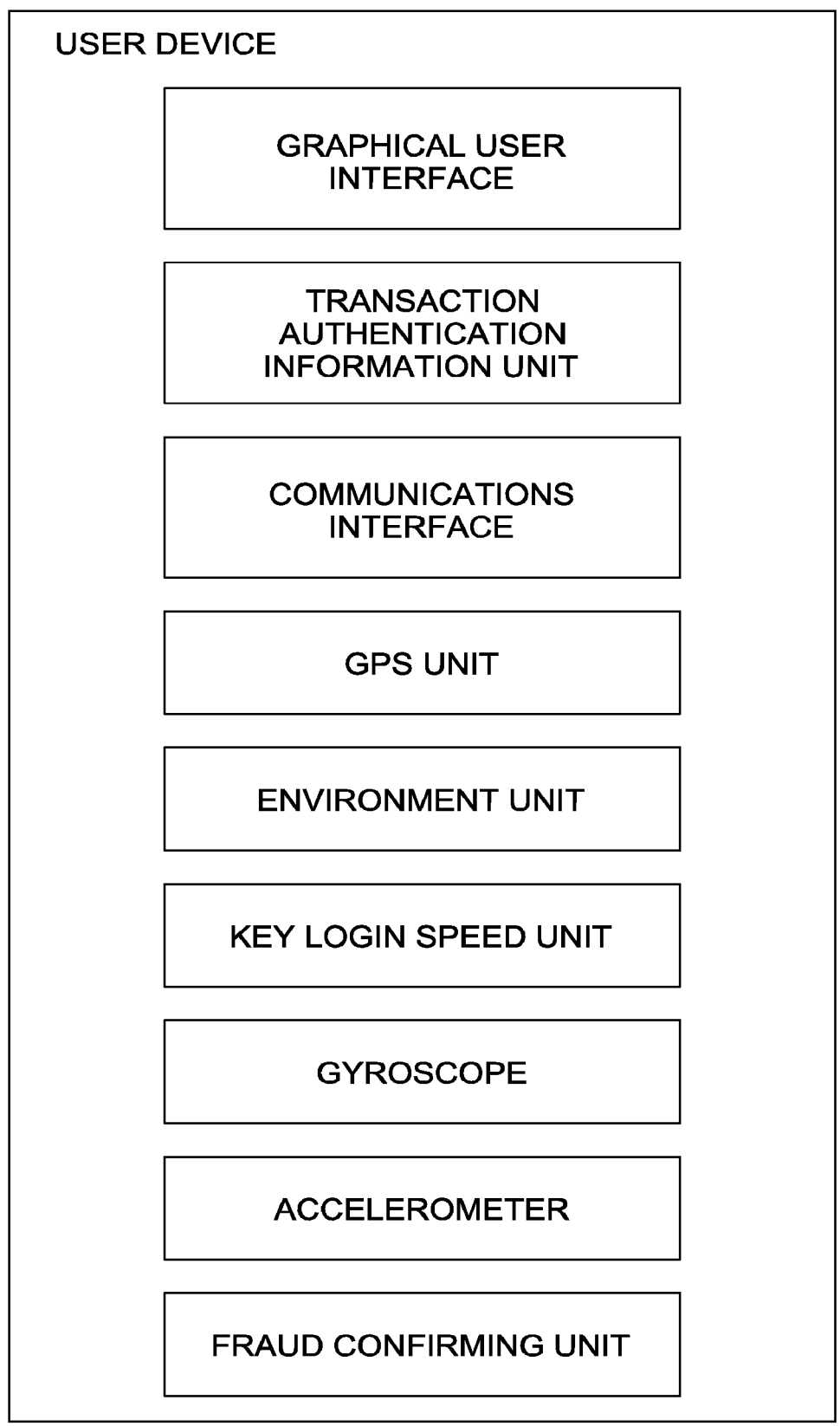
FIG. 5 is a block diagram of an example of user device suitable for use with the fraud prevention system.

Referring to FIG. 5, shown is a block diagram of another user device suitable for use with the fraud prevention system of FIG. 1. The user device is similar to the user device of FIG. 3B except that it includes a fraud confirming unit. In FIG. 5, the functionality of each of the graphical user interface, the transaction authentication unit or more generally the operation authentication unit as previously discussed, the communications interface, the GPS unit, the environment unit, the key login speed unit, the gyroscope, the accelerometer, and the fraud confirming unit can be implemented using any suitable combination of software, hardware, and firmware.

The transaction authentication unit or more generally the operation authentication unit communicates with the fraud confirming unit to collectively provide a mechanism for responding to requests for verification that has been recently carried out, and on-going transactions are indeed non-fraudulent transactions and for flagging fraudulent transactions.

Such a mechanism will now be described in more detail with reference to FIG. 6A, which is a messaging flow diagram for authentication of a transaction in the network communications system of FIG. 1 in a push system for a case when verification of fraudulence of a transaction shows fraudulence. In this messaging flow a transaction is underway between a server at a transaction site and an authentication, and the authentication device sends a VERIFY message to a fraud reporting unit containing information regarding the transaction. The fraud reporting unit may be located at a fraud reporting center that contains a database, such as the fraud reporting centers of FIG. 1.

The information contained in the VERIFY message includes information suitable for identifying a fraudulent user, such as a fraudulent merchant for example. For example, the information may include but is not limited to any one or more of the location of the user device requesting the transaction, identification of the user device, identification of the user of the user device, the number of transactions of a particular merchant, user, or other entity, which have been identified as fraudulent and/or the number of transactions of a particular merchant, user, or other entity, which have been identified as potentially fraudulent, and any user specific information.

The fraud reporting unit verifies its database to determine whether the received information matches any entry in the database that would confirm that the transaction is potentially fraudulent.

For example, the database might contain an entry for a particular merchant called "BadBuy" for example, with the entry indicating five fraudulent transactions in the last three days. As such, in some implementations any transaction from this merchant would be identified a potentially fraudulent. The fraud reporting unit replies to the authentication device with a REPLY message indicating whether the transaction is potentially fraudulent or not. The authentication device verifies whether the message indicates a potentially fraudulent transaction or not, and in this case the transaction is potentially fraudulent. The authentication device sends a VERIFICATION message to the user device indicating that a potentially fraudulent transaction is underway and requesting user credentials and confirmation of whether the transaction is indeed fraudulent or not.

The user provides input of the credentials and in this case the user confirms that the transaction is indeed fraudulent by sending a REPLY message to the authentication device. The REPLY message contains information confirming that the transaction is fraudulent together with the user credentials. The authentication device verifies that the user credentials are correct and determines that the transaction is fraudulent based on the information contained in the REPLY message.

In this example, the authentication device then sends a notification message to a call agent containing information related to the transaction. For example, the information includes any one or more of the location of the user device requesting the transaction, identification of the user device, identification of the user of the user device, and any user, merchant, or other entity's or transaction specific information. The call agent looks up which fraud reporting units are to be notified and relays the received NOTIFICATION message to the fraud reporting units.

In some embodiments, this may lead to a block being applied on the user's card or transactions so that further transactions are not allowed, until the issue is resolved.

Responsive to receiving the NOTIFICATION messages, the fraud reporting units update their respective databases with the information contained in the NOTIFICATION messages. The fraud reporting unit that receives the VERIFY message also looks up its database to identify other user devices that should be notified for potentially fraudulent transactions.

For example, the fraud detection unit may look through transactions in its database which have occurred in the last sixty days together with on-going transactions and identify transactions from a particular user device. Alternatively, the fraud detection unit may look in its database for transactions which have occurred in the last sixty days, together with on-going transactions, and identify potentially fraudulent transactions involving a specific amount from a particular merchant. The fraud reporting unit then sends a NOTIFICATION REQUEST containing call information for calling other user devices associated with the identified potentially fraudulent transactions, together with information on the potentially fraudulent transactions. Responsive to receiving the NOTIFICATION REQUEST, the call agent sends NOTIFICATION to the other user call devices.

The notification may be in any format for which can be received on a user device. In some embodiments, the notification is in the form of a rich push notifications including, but not limited to, an email, an SMS, instant message, VOIP call, or a phone call, and other medium of electronic messaging. Furthermore, each notification includes information for identifying a respective transaction and allowing the user to determine whether the transaction is indeed fraudulent.

Fraud Detection Unit Analytics

As mentioned previously, the fraud detection unit monitors various aspects of the transaction and takes into circumstances into the weighted decision. Analysis includes clustering merchants and transactions by their characteristics (e.g., location, type of business, ownership, item purchased) and comparing those clusters with clusters of individuals making the purchase (e.g., gender, age, purchase history, known interests). These multidimensional cluster comparisons are performed to estimate the a-priori probability of a given transaction.

Further characteristics may be populated for the fraud detection unit including mining for online consumer complaints on transactions and merchants, mining location and update time information from web posts and social media sites, and analyzing mobile user flagged transactions. This type of information is analyzed and adapted to the database to provide better analysis and notifications without involving third parties and direct user interaction requiring responses.

The database also takes into consideration authentication history. This includes the number of failed authentications for a particular device. The device may be for a merchant or a customer. Each time a device tries to authenticate with a device for a transaction, the database is updated to with another entry of data to populate. In this fashion, the authentication success rate may be utilized as an indicator of whether a particular device is suspicious of illegitimate conduct based on the number of failed authentication attempts and secondly how contemporaneously the failed authentication occurred.

Figure 7:
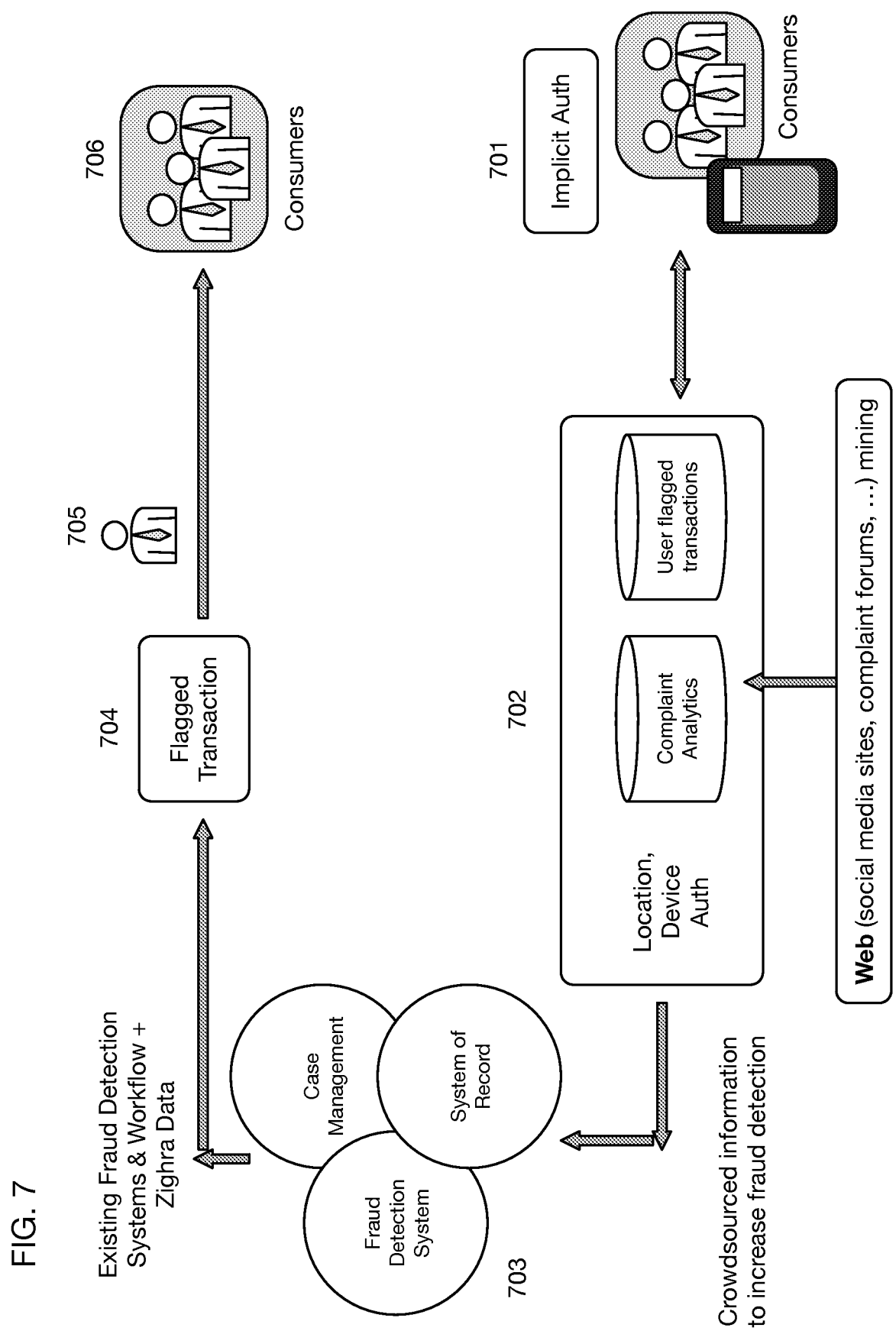
FIG. 7 represents a flow diagram of one implementation of the fraud detection unit method.

An example of the system implementation can be seen in FIG. 7. The user authenticates with the system implicitly (701) using for example, the multi-characteristic authentication system demonstrated above or the multi-layered authentication system described previously, at which point the fraud detection unit retrieves any relevant and related user specific information related to the specific merchant. Said information may be flagged within the system, or as mentioned previously, information may include consumer complaints in forums and social media sites (702), for example. This information is analyzed to verify whether the information in aggregate meets a pre-determined threshold to alter behavior or require a notification to be sent to the user before the transaction, at the point of sale (703), or post-transaction.

In situations where the threshold is met, the transaction is flagged (704) and a third party may be involved for further verification (705). Said system provides a fraud detection system and fraud resolution management (post transaction) for consumers (706) or users of the system.

For example, if the transaction is at a coffee shop, the characteristics analyzed will be with respect to coffee shops or other merchants with coffee shop like characteristics. Therefore the analytics by the fraud detection unit are targeted to the specific transaction and allow for a more accurate notification given to the user.

Figure 6A:
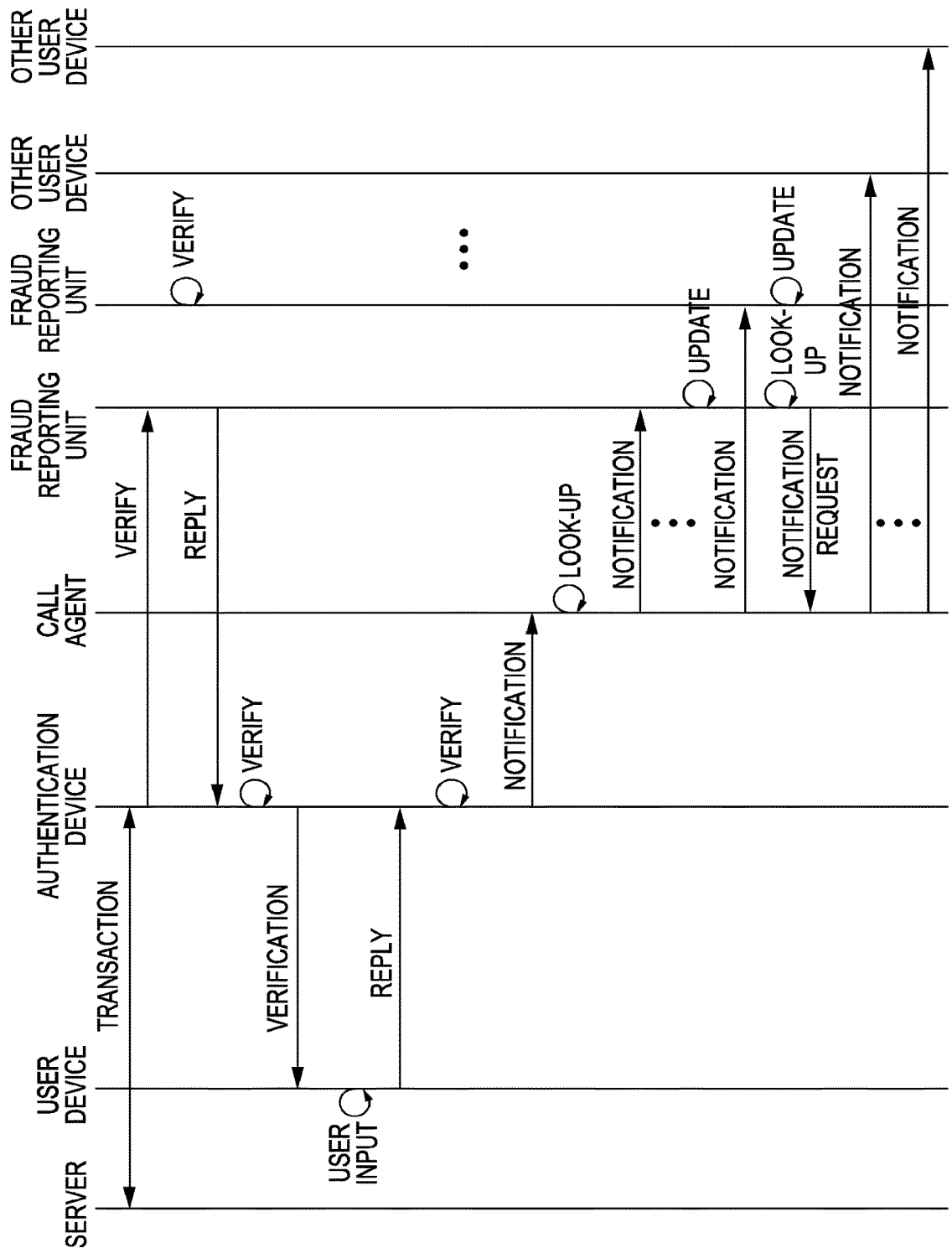
FIG. 6A is a messaging flow diagram for one embodiment of authentication of a transaction in the network communications system in a push system for a case when verification of fraudulence of a transaction shows fraudulence.

In the embodiment of FIG. 6A, the user must enter the proper credentials before confirmation of whether a transaction is fraudulent is accepted. However, in other implementations the confirmation is accepted without the need for credentials.

Figure 6B:
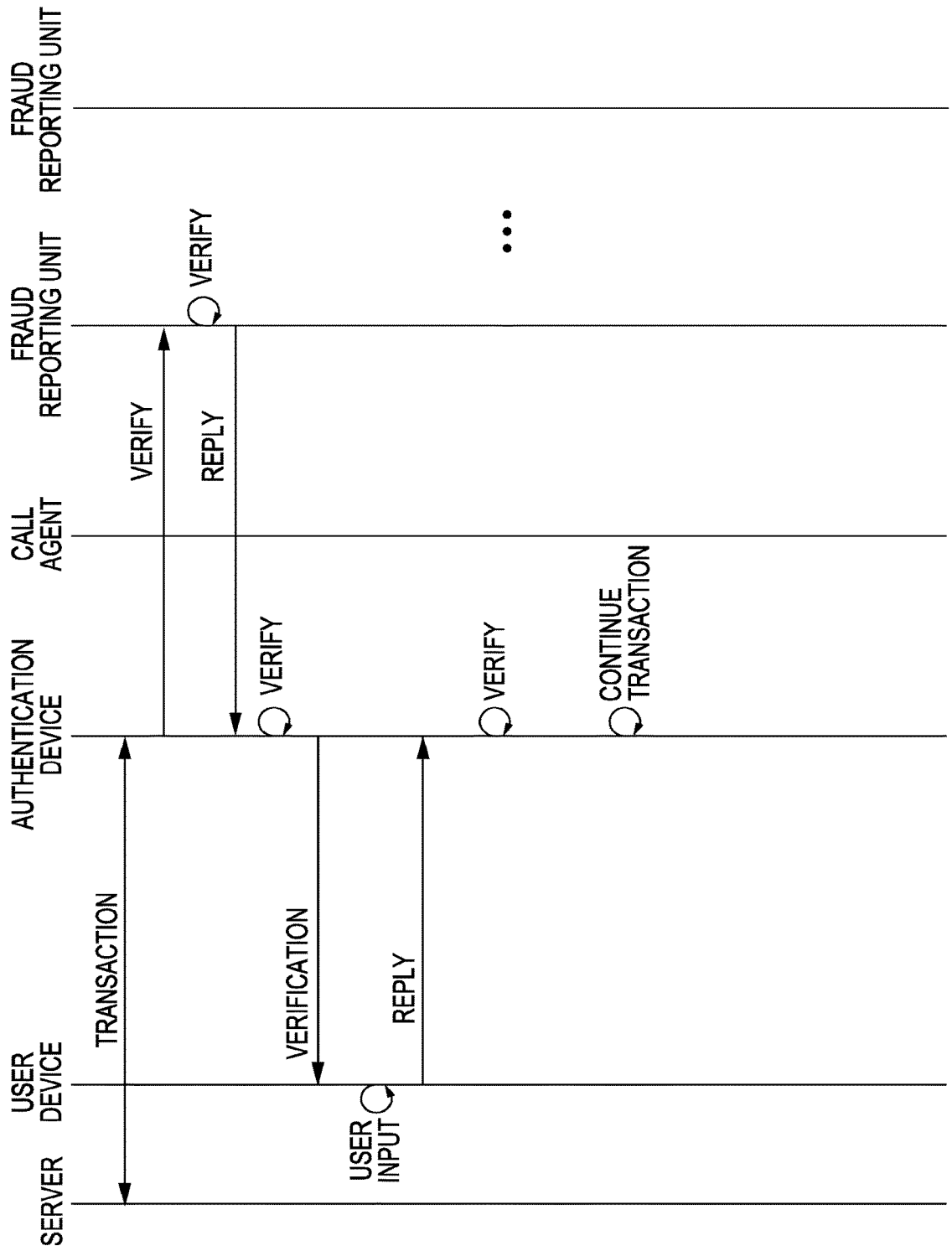
FIG. 6B is a messaging flow diagram for one embodiment of authentication of a transaction in the network communications system in a push system for a case when verification of fraudulence of a transaction shows no fraudulence.

Referring to FIG. 6B, shown is a messaging flow diagram for authentication of a transaction in the network communications system of FIG. 1 in a push system for a case when verification of fraudulence of a transaction shows no fraudulence. In this messaging flow a transaction is underway between a server at a transaction site and an authentication device. The authentication device sends a VERIFY message to a fraud reporting unit containing information regarding the transaction.

The information contained in the VERIFY message includes information suitable for identifying a fraudulent user. The fraud reporting unit verifies its database to determine whether the received information matches any entry in the database that would confirm that the transaction is potentially fraudulent. The fraud reporting unit replies to the authentication device with a REPLY message indicating whether the transaction is potentially fraudulent or not. The authentication device verifies whether the message indicates a potentially fraudulent transaction or not, and in this case the transaction is not fraudulent.

The authentication device sends a VERIFICATION message to a user device associated with the transaction indicating that a transaction is underway and that the transaction does not appear to be fraudulent. Nonetheless, the VERIFICATION message is used for requesting user credentials and confirmation of whether the transaction is indeed fraudulent or not.

The user provides input of the credentials and in this case the user confirms that the transaction is not fraudulent by sending a REPLY message to the authentication device. The REPLY message contains information confirming that the transaction is not fraudulent together with the user credentials. The authentication device verifies that the user credentials are correct and determines that the transaction is not fraudulent based on the information contained in the REPLY message. During verification the authentication unit determines that the transaction is not fraudulent and the transaction process continues.

In FIG. 6A and FIG. 6B, in some instances the transaction is being performed in real-time and the transaction cannot continue unless the user confirms that the transaction is not fraudulent. In other instances, the transaction is being initiated by a third party such as a merchant entering credit card information for a related purchase for example, and the transaction is put on hold until the user has had a chance to confirm whether the transaction is fraudulent or not. In some implementations, when a transaction has been identified as having no potential threat of fraudulence by the fraud reporting unit the transaction continues without any further verification with the user at the user device.

In FIG. 6A and FIG. 6B, in some implementations if the user credentials are incorrect, the user is asked to re-enter the credentials until the correct credentials are entered or until a maximum number of attempts is reached. When the maximum number of attempts is reached the authentication device contacts a third party to establish a call with the user's user call device.

The third party may be any third party required to verify the identity of the user conducting the transaction. In some embodiments, the third party is a call agent. The third party may be any party required from merchants, banks, consumers, and others in the ecosystem required to identify the user.

The messaging between the user device and the authentication device can be implemented using any suitable protocol. This may include mobile platform such as those used in Apple® iOS, Google® Android, BlackBerry®, Microsoft Windows Phone 8®, and other smartphones. Alternatively, with reference to FIG. 5, in some embodiments, the fraud confirming unit, the transaction authentication information unit, and the graphical user interface can be can be used to present the user with a request for confirmation of whether a transaction is fraudulent by presenting the user with an interface for entering the credentials and also with selectable buttons for confirming whether or not the transaction is fraudulent.

A number of mechanisms used for performing authentication have been described. In some embodiments, these mechanisms are used together to provide secure transactions. For example, in some embodiments, a transaction associated with a user is initiated at a server at a transaction site.

In some embodiments, a first authentication step is conducted based on a correlation between the location of the server and the location of a user device associated with the user. If the authentication succeeds then there is no need for verification with the user through the user device. However, if the authentication fails then verification is made via a push notification, a phone call, or 2-way SMS, for example, requesting user input at the user device.

If further verification is required, authentication is also made using other characteristics such as speed, acceleration, and key login in speed for example. Furthermore, communications are made with a detection unit so that it can retrieve information from the database to identify whether the transaction is potentially fraudulent.

After the above verifications, if it is deemed that the user needs to be informed, a verification message is sent to a user device associated with the user, where the user is prompted to enter user credentials and validate the transaction, reject/decline the transaction, and/or flag the transaction as fraudulent or non-fraudulent. If the transaction is flagged fraudulent, an entry is made into the database of the appropriate fraud prevention system. As mentioned previously, in some embodiments, this flagged information is verified by analyzing social media analytics such as web forums, posts, social media sites, and other private/public databases to determine reliability.

As discussed above, the database in the fraud prevention system is used to look at historical transactions of all users to check for potential fraud, and then appropriate users are notified/alerted of potential fraudulent transactions on their account, via rich push notifications, email, phone, or SMS for example.

Figure 8:
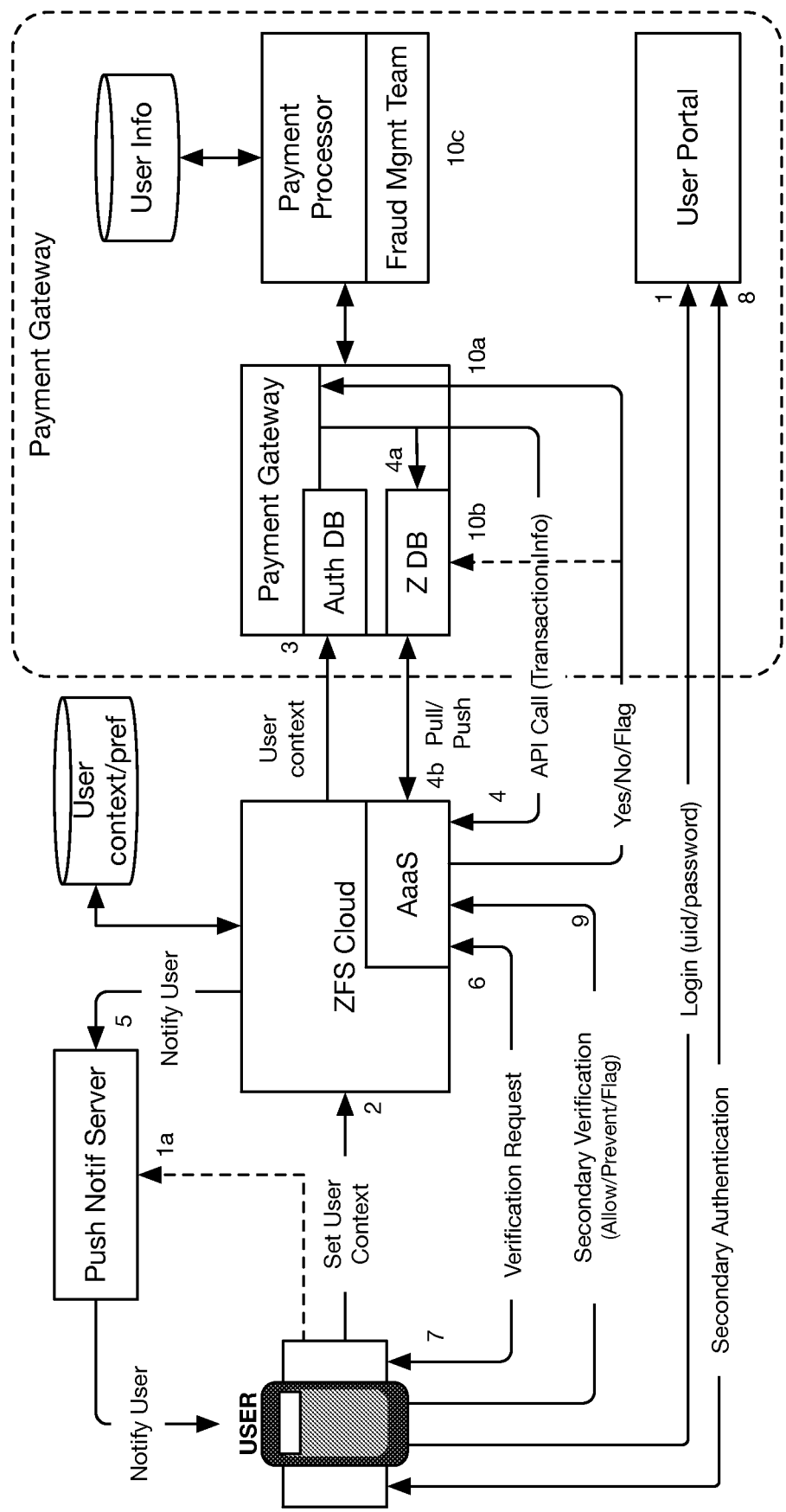
FIG. 8 represents a flow diagram of another implementation of the fraud detection unit method.

An example of the implementation of the fraud detection system and resolution management system can be seen in FIG. 8. In this example, a third party payment gateway is integrated with the system to enable credit processing. In some embodiments, the payment gateway may be part of the fraud verification and resolution management system.

The user logins in (1) to the system (payment gateway) using a mobile device as their device (1a) and registers with the system server (Fraud Detection Unit). The user sets their preferences regarding notifications and financial security with the system server (2).

These settings are passed on to the payment gateway authentication database of the payment gateway (3).

If a transaction is flagged by the payment gateway, a notification is sent to the Fraud Detection Unit utilizing an application programming interface (4). In some embodiments, the flag is stored on the payment gateway database (4a) prior to the flag being pushed to the fraud detection unit (4b).

The fraud detection unit, receiving the flag from the payment gateway, pushes the flag to the user via rich push notifications (5). The user device receives the notification (6) and the transaction information is downloaded or viewed on the user device (7).

The user may input a secondary password to authenticate (8), and the corresponding user selected action (e.g., allow/prevent/flag) is pushed to the fraud detection unit. This response is sent from the Fraud Detection Unit to the payment gateway (10a) and recorded in the database within the payment gateway (10b).

In some embodiments, a rich push notification may be sent to a user device after checking database information for various transaction information related to one or more devices. Rich push notifications include, but not limited to, an email, an SMS, instant message, VOIP call, or a phone call (automated or conventional), and other medium of electronic messaging.

For example, these alerts may be used to alert a first user device of a suspicious second user device when a first user device enters the proximity of the second user device. This may include a customer walking into a merchant's store where the customer receives an instant message on their mobile device informing the customer that the current merchant store has a transaction history including a high rate of invalid authentication.

In another example, a merchant may be alerted of a potential customer having a high level of invalid authentication with respect to a specific credit card.

In some embodiments, the alert is proximity based by a pre-determined threshold when the first user device meets the threshold relative to a second user device.

In some embodiments, the alert is given once the transaction history in the database reaches a pre-determined threshold. For example, if the number of invalid authentications for a merchant device totals 10 per month, an alert is sent to a number of user devices on the system which frequently conduct transactions at the company, utilizing the merchant device.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

The invention claimed is:

1. A method for authenticating a user of a computing device, the method being performed by one or more processors and comprising:
at a first time interval, developing a model for a first user, wherein developing the model includes (i) detecting performance of a task by the first user; (ii) determining a first set of characteristics for performance of the task by the first user; (iii) learning a first set of model parameters based on the first set of characteristics; and (iv) adjusting the model based on the first set of model parameters;
at a second time interval, detecting performance of the task on the computing device;
determining a score that is indicative of the task being performed by the first user, based at least in part on the model; and
performing an authentication operation based on a comparison of the score to a threshold;
wherein detecting performance of the task during the first time interval and the second time interval includes detecting a kinetic motion, using sensor data obtained from at least one an accelerometer or gyroscope of the computing device, and correlating the kinetic motion to the task based on contextual information obtained from at least one of a non-kinetic sensor of the computing device and/or an application that runs on the computing device.

2. The method of claim 1, wherein the task is performed using one or more keys provided with the computing device.

3. The method of claim 2, wherein the first set of characteristics is with respect to a key stroke velocity of the user.

4. The method of claim 3, wherein the method is performed at least in part on a computer system that communicates with the computing device of the user over a network.

5. The method of claim 1, wherein detecting performance of the task includes
monitoring the computing device of the user for user activity.

6. The method of claim 1, wherein developing the model includes determining a behavior model for the first user performing the task.

7. The method of claim 1, wherein the model differentiates between a manual entry and an automated entry.

8. The method of claim 1, wherein the first set of characteristics include one or more dynamic characteristics for a type of kinetic motion performed by the user.

9. The method of claim 8, wherein the type of kinetic motion includes a swipe on a screen of the computing device.

10. The method of claim 8, wherein the type of kinetic motion includes the user moving the computing device to view a display of the computing device.

11. The method of claim 10, wherein the computing device is a smart watch, and wherein the kinetic motion includes the user lifting the smart watch while worn to view the display.

12. The method of claim 8, wherein the computing device is a mobile device, and the type of kinetic motion includes a gait of the user carrying the mobile device.

13. The method of claim 12, wherein performing the authentication operation includes controlling access to the computing device.

14. The method of claim 13, wherein performing the authentication operation includes controlling access to a mobile application installed on the mobile device.

15. A computer system comprising:
one or more processors;
a memory to store a set of instructions;
wherein the one or more processors access the set of instructions to perform operations comprising:
at a first time interval, developing a model for a first user, wherein developing the model includes (i) detecting performance of a task by the first user; (ii) determining a first set of characteristics for performance of the task by the first user; (iii) learning a first set of model parameters based on the first set of characteristics; and (iv) adjusting the model based on the first set of model parameters;
at a second time interval, detecting performance of the task on the computer system;
determining a score that is indicative of the task being performed by the first user, based at least in part on the model; and
performing an authentication operation based on a comparison of the score to a threshold; and
wherein detecting performance of the task during the first time interval and the second time interval includes detecting a kinetic motion, using sensor data obtained from at least one an accelerometer or gyroscope of the computer system, and correlating the kinetic motion to the task based on contextual information obtained from at least one of a non-kinetic sensor of the computer system and/or an application that runs on the computer system.

16. The computer system of claim 15, wherein the computer system includes a mobile device of the user.

17. The computer system of claim 16, wherein detecting performance of the task includes detecting one or more dynamic characteristics using one or more sensors of the mobile device on which the task is performed.

18. A non-transitory computer readable medium that stores instructions, which when executed by one or more processors of a computer system, cause the computer system to perform operations that include:
at a first time interval, developing a model for a first user, wherein developing the model includes (i) detecting performance of a task by the first user; (ii) determining a first set of characteristics for performance of the task by the first user; (iii) learning a first set of model parameters based on the first set of characteristics; and (iv) adjusting the model based on the first set of model parameters;
at a second time interval, detecting performance of the task on computer system;
determining a score that is indicative of the task being performed by the first user based at least in part on the model; and
performing an authentication operation based on a comparison of the score to a threshold;
wherein detecting performance of the task during the first time interval and the second time interval includes detecting a kinetic motion, using sensor data obtained from at least one an accelerometer or gyroscope of the computer system, and correlating the kinetic motion to the task based on contextual information obtained from at least one of a non-kinetic sensor of the computer system and/or an application that runs on the computer system.

19. The non-transitory computer readable medium of claim 18, wherein the computer system includes a mobile device of a user.

* * * * *